(12) United States Patent
Fujioka et al.

(10) Patent No.: US 10,554,120 B2
(45) Date of Patent: Feb. 4, 2020

(54) POWER CONVERSION DEVICE

(71) Applicant: Mitsubishi Electric Corporation, Tokyo (JP)

(72) Inventors: Kazuhiro Fujioka, Tokyo (JP); Nobuhiro Kihara, Tokyo (JP); Mai Nakada, Tokyo (JP); Yoshihiro Takeshima, Tokyo (JP); Yujiro Nakada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/411,800

(22) Filed: May 14, 2019

(65) Prior Publication Data

US 2020/0007027 A1 Jan. 2, 2020

(30) Foreign Application Priority Data

Jul. 2, 2018 (JP) ................................. 2018-125806

(51) Int. Cl.
*H02M 1/32* (2007.01)
*H02M 3/335* (2006.01)
(Continued)

(52) U.S. Cl.
CPC ......... *H02M 1/32* (2013.01); *H02M 3/33507* (2013.01); *G05F 1/565* (2013.01);
(Continued)

(58) Field of Classification Search
CPC .......... G05F 1/565; H02M 2001/0074; H02M 3/1584; H02M 2003/1586
(Continued)

(56) References Cited

U.S. PATENT DOCUMENTS

| 9,007,042 B2* | 4/2015 | Okuda | H02M 3/158 |
| | | | 323/271 |
| 2011/0134672 A1* | 6/2011 | Sato | H02M 1/10 |
| | | | 363/126 |

(Continued)

FOREIGN PATENT DOCUMENTS

| JP | 2009-213246 A | 9/2009 |
| JP | 2017-212770 A | 11/2017 |
| JP | 2017-229123 A | 12/2017 |

*Primary Examiner* — Gary A Nash
(74) *Attorney, Agent, or Firm* — Sughrue Mion, PLLLC; Richard C. Turner

(57) ABSTRACT

[Technical Problem] In a power conversion device for stepping up or stepping down the input voltage, when voltage converter become out of order, it is not possible to specify an IGBT element and a current sensor, which is in an extraordinary fault condition.

[Solution to Problem] The power conversion device is configured to detect a voltage value of a smoothing condenser, connected in parallel to a load, where the load is to be connected to the power conversion device; detects, by a first current sensor, a current which flows through switching elements in a plurality of voltage converter; decides an abnormality of a switching element, by switching the switching element one by one; specifies the abnormality of the switching element; and specifies that the first current sensor is in an abnormal state, in a case where there is no abnormal state switching elements.

14 Claims, 18 Drawing Sheets

(51) Int. Cl.
  *H02M 1/00* (2006.01)
  *H02M 3/158* (2006.01)
  *G05F 1/565* (2006.01)

(52) U.S. Cl.
  CPC .. *H02M 3/1584* (2013.01); *H02M 2001/0074* (2013.01); *H02M 2003/1586* (2013.01)

(58) Field of Classification Search
  USPC .......... 323/271, 272, 277, 284, 285; 363/65, 363/67–70, 78, 79, 89
  See application file for complete search history.

(56) References Cited

U.S. PATENT DOCUMENTS

| | | | | |
|---|---|---|---|---|
| 2013/0100720 | A1* | 4/2013 | Holliday | H02H 9/04 363/56.11 |
| 2014/0376282 | A1* | 12/2014 | Mine | H02M 1/32 363/37 |
| 2015/0103573 | A1* | 4/2015 | Zhu | H02M 1/36 363/131 |
| 2016/0280080 | A1* | 9/2016 | Takei | B60L 11/1811 |

* cited by examiner

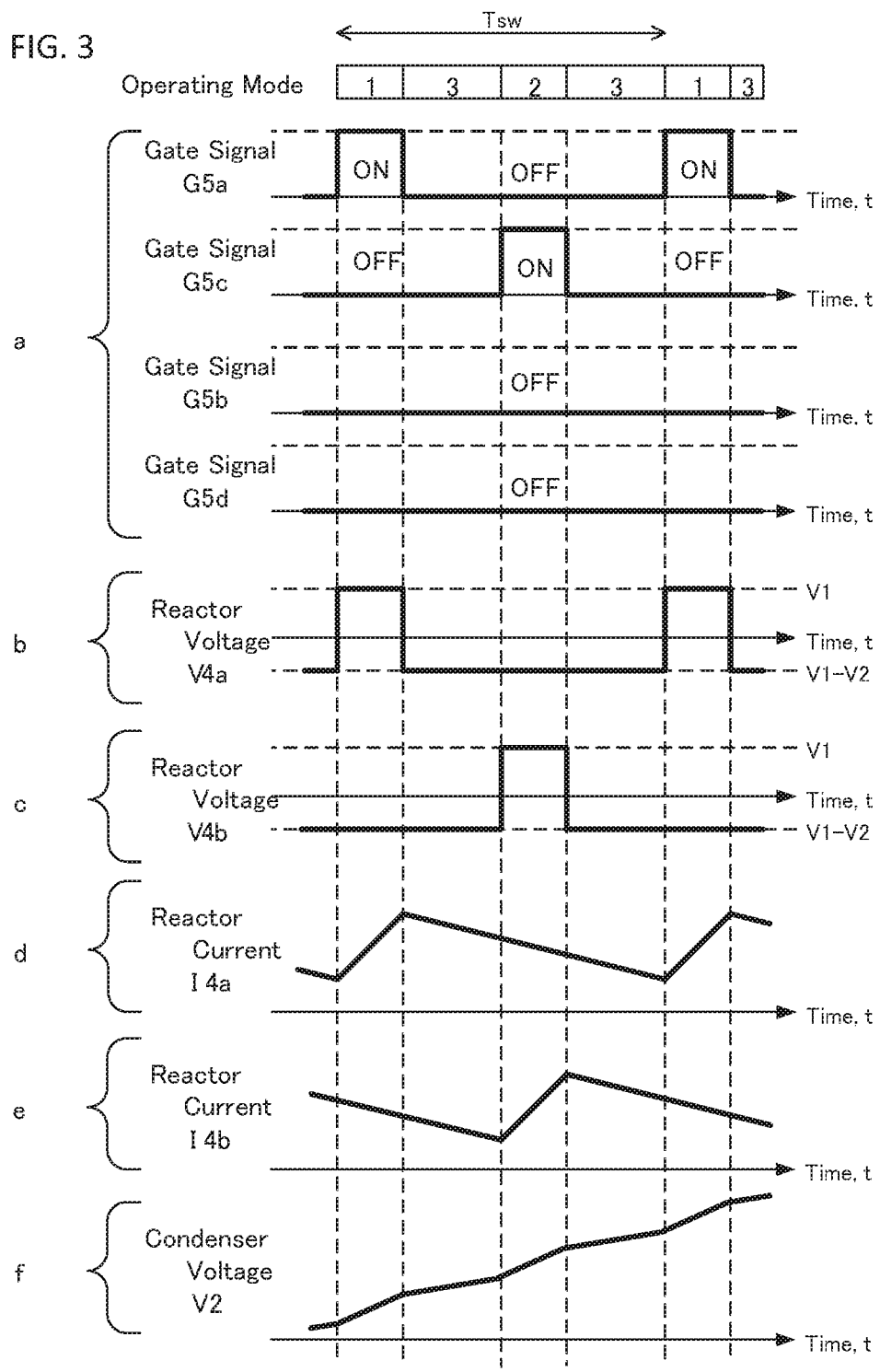

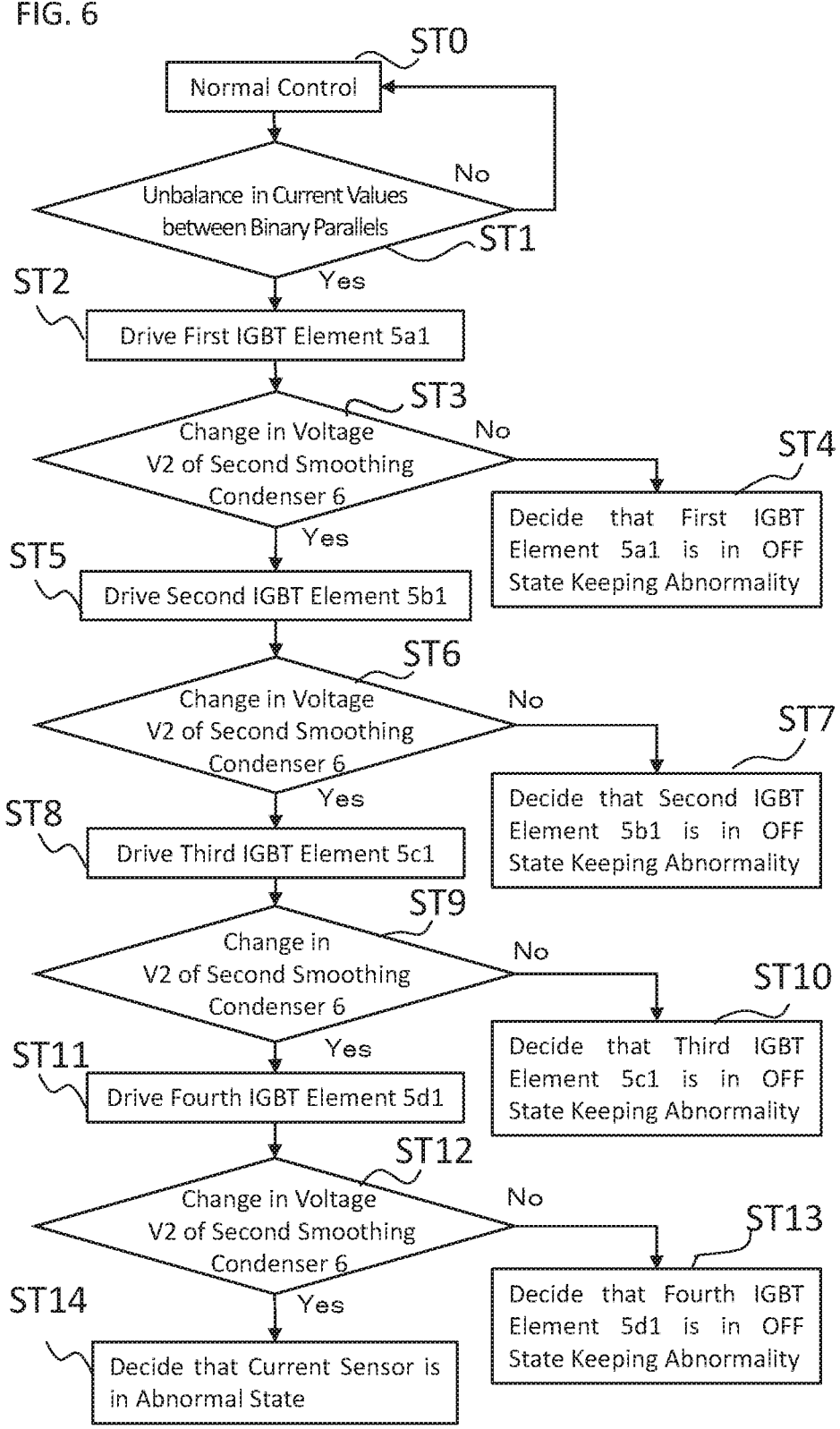

POWER CONVERSION DEVICE

FIELD OF THE INVENTION

The present application relates to a power conversion device.

BACKGROUND OF THE INVENTION

A conventional power conversion device is provided with a voltage conversion unit, which steps up or steps down the input voltage, and constitutes a power source system, which is inclusive of an input power source and an electric storage device. The voltage conversion unit is composed of switching elements, rectifying devices, and reactors, and steps up or steps down the input voltage of direct current, by repeatedly driving the switching elements to turn on and off. Moreover, in the power conversion device, a voltage conversion unit is configured to be in multi parallel constitution, in order to convert the input voltage of direct current into a predetermined output voltage. The voltage conversion unit, which is connected in multi parallel constitution, uses a current sensor and a voltage sensor to control its output, so that overcurrent and overvoltage may not be caused. In addition, the voltage conversion unit performs controlling in step up and step down, so that its output may not exceed standard values of the step up voltage and the step down voltage.

In a multi-phase converting unit, which includes a plurality of voltage conversion units connected in parallel, the voltage conversion units are controlled, so that the number of voltage conversion units, which are made to stop, may increase gradually. So doing, the multi-phase converting unit reveals characteristics that, if a voltage conversion unit is in a normal state, an output of the multi-phase converting unit will have a proper change before and after the switching, and if a voltage conversion unit is in an abnormal state, an output of the multi-phase converting unit will exhibit an abnormal change before and after the switching. There are shown a failure detection device and a power source device, which use those characteristics and can specify one or more voltage conversion unit(s) which is or are in an abnormal state. (Patent Document 1)

CITATION LIST

Patent Literature

Patent Document 1: JP 2017-212770, A

SUMMARY OF THE INVENTION

Technical Problem

However, according to the failure detection device and the power source device which are described in Patent Document 1, it is not yet possible to specify an abnormal state switching element in the voltage conversion unit, and one or more voltage conversion unit(s), which is or are specified to be in an abnormal state, is or are made to stop. Accordingly, normal operation cannot be continued. Further, failure in a current sensor is not assumed. In the case where the current sensor falls into an abnormal state, one or more voltage conversion unit(s) is or are specified to be in an abnormal state based on a current value. Accordingly, an abnormal state part cannot be spotted accurately, and it is not possible to decide a switching element which is in an abnormal state.

Furthermore, because one or more voltage conversion unit(s), which is or are specified to be in an abnormal state, is or are made to stop, it is not possible to continue the normal operation.

The present application is made in order to solve the above mentioned problems. By specifying an abnormal state switching element in the voltage conversion unit, a power conversion device makes it possible to continue the operation, where the use of an abnormal state switching element is eliminated, and only a normal state switching element is used. Moreover, the present application aims at obtaining a power conversion device, which can decide accurately a part of abnormal state, by specifying the abnormal state in a current sensor, and further can perform the continuous operation, where a current sensor in an abnormal state is not used.

Solution to Problem

A power conversion device which is disclosed in the present application is a power conversion device, which is to be placed between an input power source and a load, and the power conversion device includes; a first smoothing condenser, which is connected in parallel to the input power source; a second smoothing condenser, which is connected in parallel to the load and has a negative electrode connected to a negative electrode of the first smoothing condenser; a plurality of voltage conversion units, which are provided between the first smoothing condenser and the second smoothing condenser and convert voltage by operations of switching elements; a first current sensor, which detects current flowing through the switching element in the voltage conversion unit; a first voltage sensor, which detects voltage of the second smoothing condenser; a control signal unit, which performs drive-control of the switching elements; and a failure decision unit, which, in a case where a value calculated based on a detected value of the first current sensor deviates from a predetermined value, decides that the first current sensor is in an abnormal state based on a value of the first voltage sensor.

Advantageous Effects of Invention

According to the power conversion device of the present application, it is possible to continue the normal operating state, by specifying a switching element or a first current sensor which is in an abnormal state, from among switching elements in a plurality of voltage conversion units and a first current sensor which detects a value of the current, flowing through a switching element in each of the voltage conversion units.

BRIEF DESCRIPTION OF THE DRAWINGS

FIG. 3 is a wave form chart showing ideal operating wave forms in operating modes, at the time of power run operation, according to Embodiment 1 of the present application;

FIG. 6 is a drawing showing a flow chart in failure decision, according to Embodiment 1 of the present application;

DETAILED DESCRIPTION OF THE INVENTION

Embodiment 1

Figure 1:
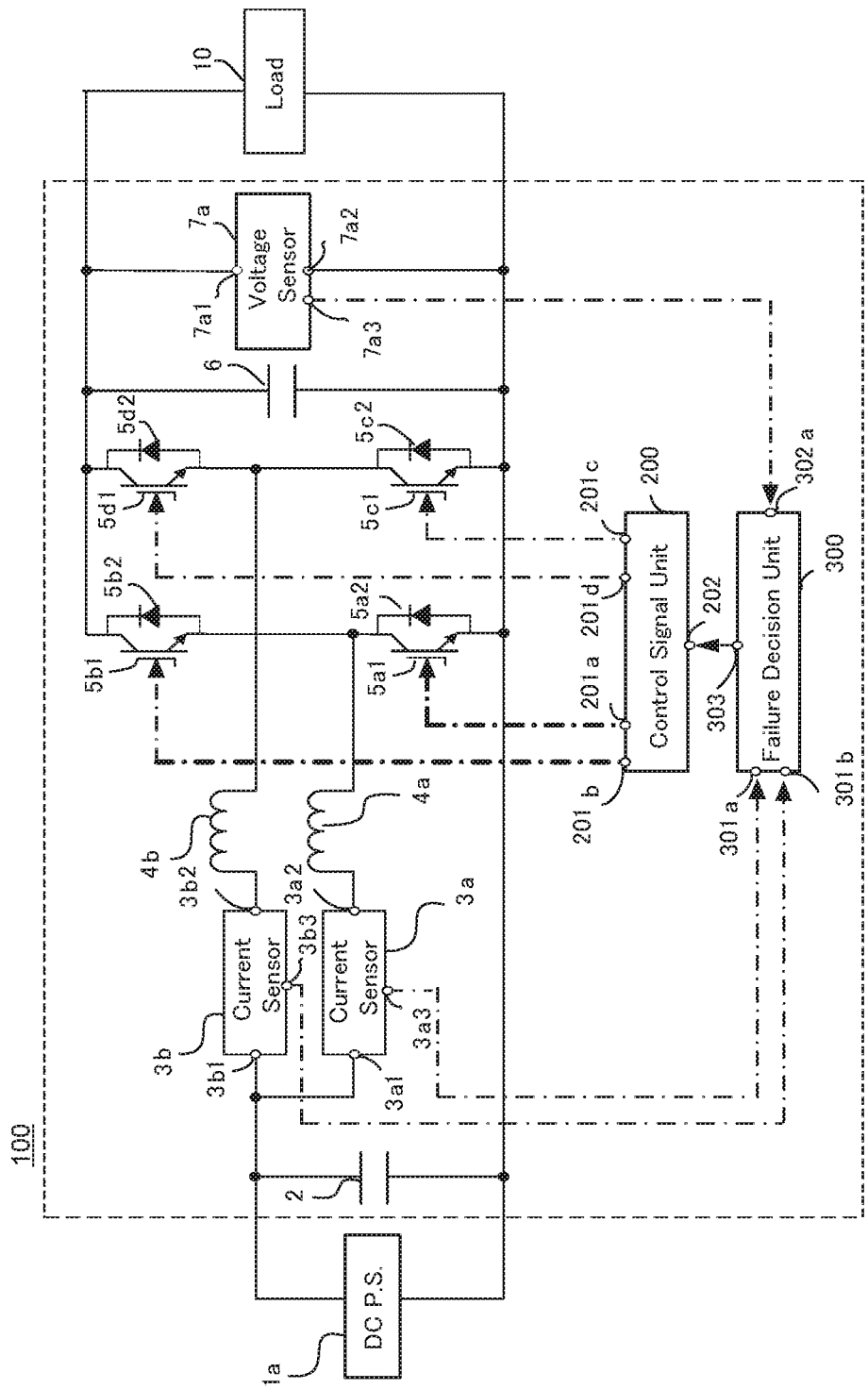
FIG. 1 is a circuit diagram showing a power conversion device according to Embodiment 1 of the present application.

Referring to FIG. 1, explanation about Embodiment 1 of the present application will be made. FIG. 1 is a circuit diagram of a power conversion device 100 for explaining Embodiment 1 of the present application.

It is to be noted that, in each of the drawings, the same reference signs are used to refer to the same or corresponding components.

As shown in FIG. 1, a power conversion device 100, which is placed between a direct current power source 1a and a load 10, includes a first smoothing condenser 2, a second smoothing condenser 6, a first reactor 4a, a second reactor 4b, a first current sensor 3a which detects current flowing through the first reactor 4a, and a second current sensor 3b which detects current flowing through the second reactor 4b. The power conversion device 100 is provided with, as a first voltage conversion unit, a first IGBT element 5a1 and a first diode 5a2 which is in inverse parallel connection with the first IGBT element 5a1; as a second voltage conversion unit, a second IGBT element 5b1 and a second diode 5b2 which is in inverse parallel connection with the second IGBT element 5b1; as a third voltage conversion units, a third IGBT element 5c1 and a third diode 5c2 which is in inverse parallel connection with the third IGBT element 5c1; and as a fourth voltage conversion unit, a fourth IGBT element 5d1 and a fourth diode 5d2 which is in inverse parallel connection with the fourth IGBT element 5d1; and is composed of a first voltage sensor 7a which detects a both end voltage of the second smoothing condenser 6, a control signal unit 200, and a failure decision unit 300.

The control signal unit 200 generates gate signals of the first to fourth IGBT elements 5a1 to 5d1, and turns on and off the first to fourth IGBT elements 5a1 to 5d1, at a switching frequency fsw (switching period Tsw). The failure decision unit 300 performs failure decision, based on detected values of the first current sensor 3a, the second current sensor 3b, and the first voltage sensor 7a.

The first smoothing condenser 2 is connected in parallel to the direct current power source 1a. A terminal 3a1 on one side of the first current sensor 3a is connected to a positive electrode of the first smoothing condenser 2 and a terminal 3b1 on one side of the second current sensor 3b. A terminal 3a2 on the other side of the first current sensor 3a is connected to the collector terminal of the first IGBT element 5a1 and the emitter terminal of the second IGBT element 5b1, via the first reactor 4a. A terminal 3b2 on the other side of the second current sensor 3b is connected to the collector terminal of the third IGBT element 5c1 and the emitter terminal of the fourth IGBT element 5d1, via the second reactor 4b.

The emitter terminal of the first IGBT element 5a1 and the emitter terminal of the third IGBT element 5c1 are connected to the negative electrode of the first smoothing condenser 2 and the negative electrode of the second smoothing condenser 6. The collector terminal of the second IGBT element 5b1 and the collector terminal of the fourth IGBT element 5d1 are connected to the positive electrode of the second smoothing condenser 6. A terminal 7a1 on one side of the first voltage sensor 7a is connected to the positive electrode of the second smoothing condenser 6, and a terminal 7a2 on the other side is connected the negative electrode. The load 10 is connected in parallel to the second smoothing condenser 6.

The first output terminal 201a of the control signal unit 200 is connected to the gate terminal of the first IGBT element 5a1, and the second output terminal 201b is connected to the gate terminal of the second IGBT element 5b1. The third output terminal 201c is connected to the gate terminal of the third IGBT element 5c1, and the fourth output terminal 201d is connected to the gate terminal of the fourth IGBT element 5d1. The first input terminal 301a of the failure decision unit 300 is connected to the output terminal 3a3 of the first current sensor 3a; the second input terminal 301b is connected to the output terminal 3b3 of the second current sensor 3b; and the third input terminal 302a is connected to the output terminal 7a3 of the first voltage sensor 7a. The input terminal 202 of the control signal unit 200 is connected to the output terminal 303 of the failure decision unit 300.

As operating states of the power conversion device 100 which is in a steady state, there exist two states; one (henceforth referred to as power run operation) is a state, where electric power is supplied from the first smoothing condenser 2 to the second smoothing condenser 6, and the other (henceforth referred to as regenerative operation) is a state, where electric power is supplied from the second smoothing condenser 6 to the first smoothing condenser 2, by exchanging the configurations of the direct current power source 1a and the load 10, which are shown in FIG. 1.

Figure 2A:
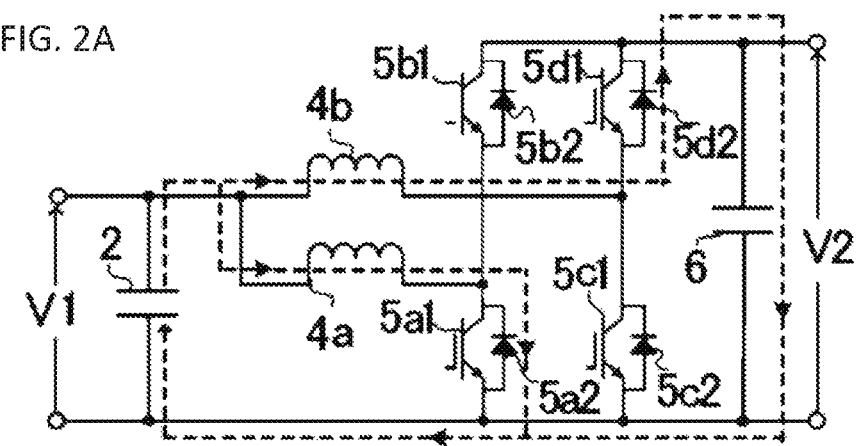
FIG. 2A is a circuit diagram showing a first operating mode at the time of power run operation, according to Embodiment 1 of the present application.
Figure 2B:
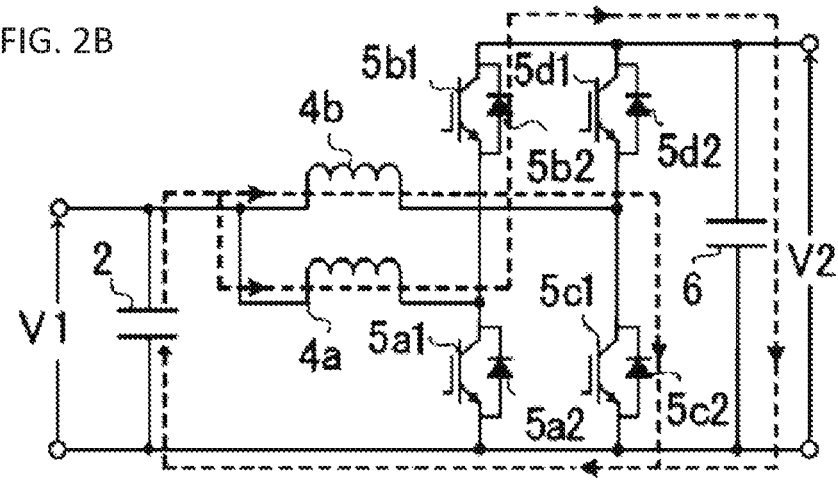
FIG. 2B is a circuit diagram showing a second operating mode at the time of power run operation, according to Embodiment 1 of the present application.
Figure 2C:
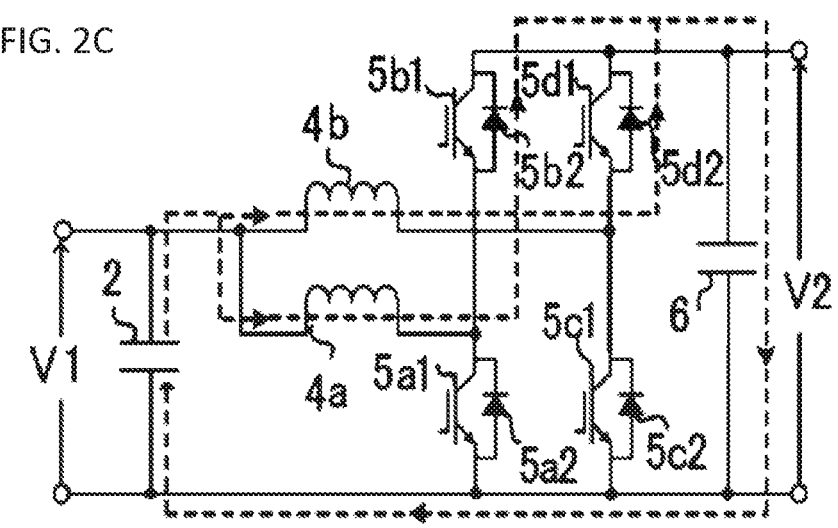
FIG. 2C is a circuit diagram showing a third operating mode at the time of power run operation, according to Embodiment 1 of the present application.

FIG. 2A, FIG. 2B, and FIG. 2C are circuit diagrams for explaining operating modes at the time of power run operation, according to Embodiment 1 of the present application. FIG. 3 shows ideal operating wave forms at the time of power run operation, according to Embodiment 1 of the present application. Dotted lines in FIG. 2A, FIG. 2B, and FIG. 2C represent current pathways. In FIG. 3, relationships in the operating modes are represented among gate signals G5a, G5b, G5c, G5d of the first to fourth IGBT elements 5a1 to 5d1; a both end voltage V4a of the first reactor 4a; a both end voltage V4b of the second reactor 4b; a current I4a which flows through the first reactor 4a; a current I4b which flows through the second reactor 4b; and a voltage V2 of the second smoothing condenser 6. As shown in FIG. 3, an operating mode at the beginning is a first operating mode, which is shown in FIG. 2A. In the first operating mode, the first IGBT element 5a1 becomes turned on, and the second IGBT element 5b1 and the third IGBT element 5c1 and the fourth IGBT element 5d1 become turned off. The current pathway includes a pathway where current passes through the first smoothing condenser 2, the first reactor 4a, the first IGBT element 5a1, and the first smoothing condenser 2, and a pathway where current passes through the first smoothing condenser 2, the second reactor 4b, the fourth diode 5d2 and the second smoothing condenser 6, and the first smoothing condenser 2. At the both ends of the first reactor 4a, a voltage V1 is applied, and at the both ends of the second reactor 4b, a voltage (V1-V2) is applied. As for the direction of current, a direction at the time of power run operation is defined as positive.

The next operating mode is a third operating mode, which is shown in FIG. 2C. In the third operating mode, the first to fourth IGBT elements 5a1 to 5d1 become turned off, as shown in FIG. 2C. The current pathway includes a pathway where current passes through the first smoothing condenser 2, the first reactor 4a, the second diode 5b2, the second smoothing condenser 6, and the first smoothing condenser 2, and a pathway where current passes through the first smoothing condenser 2, the second reactor 4b, the fourth diode 5d2, the second smoothing condenser 6, and the first smoothing condenser 2. At the both ends of the first reactor 4a and at the both ends of the second reactor 4b, voltages (V1-V2) are applied.

The next operating mode is a second operating mode, which is shown in FIG. 2B. In the second operating mode, as shown in FIG. 2B, the third IGBT element 5c1 becomes turned on, and the first IGBT element 5a1, the second IGBT element 5b1 and the fourth IGBT element 5d1 become turned off. The current pathway includes a pathway where current passes through the first smoothing condenser 2, the first reactor 4a, the second diode 5b2, the second smoothing condenser 6, and the first smoothing condenser 2, and a pathway where current passes through the first smoothing condenser 2, the second reactor 4b, the third IGBT element 5c1 and the first smoothing condenser 2. At the both ends of the first reactor 4a, a voltage (V1-V2) is applied, and at the both ends of the second reactor 4b, a voltage V1 is applied.

The next operating mode is a third operating mode, which is shown in FIG. 2C. As the third operating mode is identical to or the same with the before mentioned second operating mode, the explanation is omitted.

By repetition of a series of modes which include "from a first operating mode, a third operating mode, a second operating mode, and a third operating mode," it becomes possible to step up the voltage V1 of the first smoothing condenser 2 to an arbitrary voltage, and output it as the voltage V2 of the second smoothing condenser 6.

In the case of the regenerative operation, a different point from the power run operation is only in that, the directions of currents which flow through the first to fourth IGBT elements 5a1 to 5d1; the gate signal G5a of the first IGBT element 5a1 is exchanged with the gate signal G5b of the second IGBT element 5b1; the gate signal G5c of the third IGBT element 5c1 is exchanged with the gate signal G5d of the fourth IGBT element 5d1; and the voltage V2 is stepped down. The current pathways are the same in the both operations. Accordingly, no explanation in the regenerative operation will be made also in subsequent explanation.

In the power conversion device 100, the first to fourth IGBT elements 5a1 to 5d1 are controlled to turn on and off, so that a V2 detected value may become in agreement with a V2 target value. In the case where malfunction is caused in any one of the first to fourth IGBT elements 5a1 to 5d1, a current value I4a of the first reactor 4a or a current value I4b of the second reactor 4b represents an abnormal value; current values in the two pathways become unbalanced; and increase in the current value I4a or the current value I4b enlarges also a loss. As any of the first to fourth IGBT elements 5a1 to 5d1 may exceed in heat proof temperature and overcurrent may be caused to flow, normal operation becomes impossible.

As an example of the before mentioned malfunction, an abnormal case (henceforth, referred to as OFF state keeping abnormality) will be presented, where any of the first to fourth IGBT elements 5a1 to 5d1 is in open failure and does not allow current to flow through.

Figure 4A:
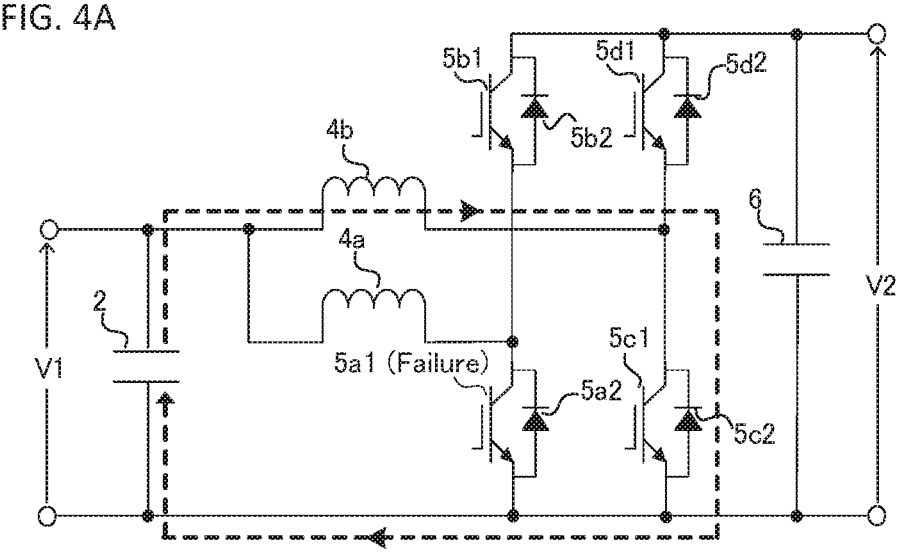
FIG. 4A is a circuit diagram showing a fourth operating mode of the power run operation, in a case where an OFF state keeping abnormality is arisen in a first IGBT element, according to Embodiment 1 of the present application.
Figure 4B:
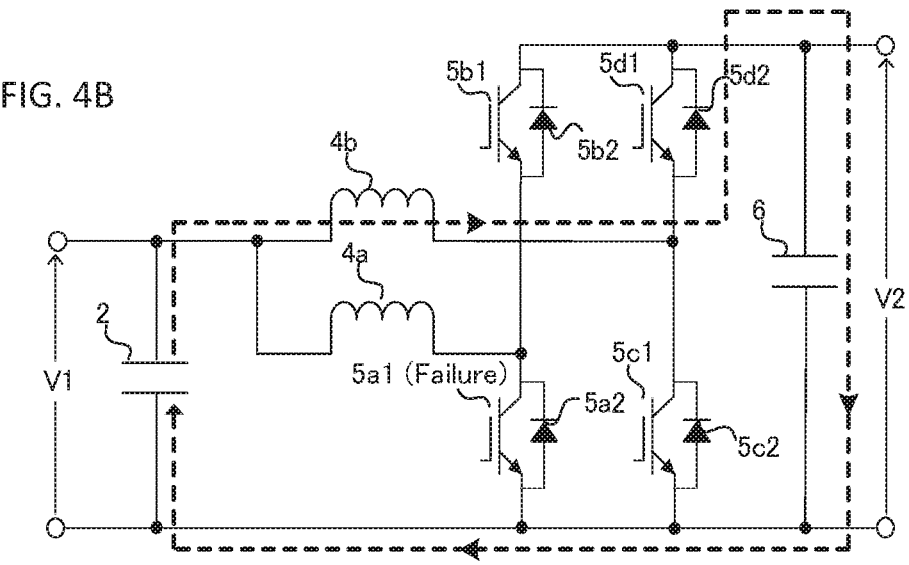
FIG. 4B is a circuit diagram showing a fifth operating mode of the power run operation, in a case where an OFF state keeping abnormality is arisen in the first IGBT element, according to Embodiment 1 of the present application.

FIG. 4A and FIG. 4B are circuit diagrams for explaining operating modes in the power run operation, in the case where an OFF state keeping abnormality is caused in the first IGBT element 5a1, which is in accordance with Embodiment 1 of the present application. A current pathway of the fourth operating mode in the power run operation, which is shown in FIG. 4A, and a current pathway of the fifth operating mode in the power run operation, which is shown in FIG. 4B, are identical to or the same with those of FIG. 2A, FIG. 2B, and FIG. 2C of Embodiment 1. Therefore, the explanation is omitted.

Figure 5:
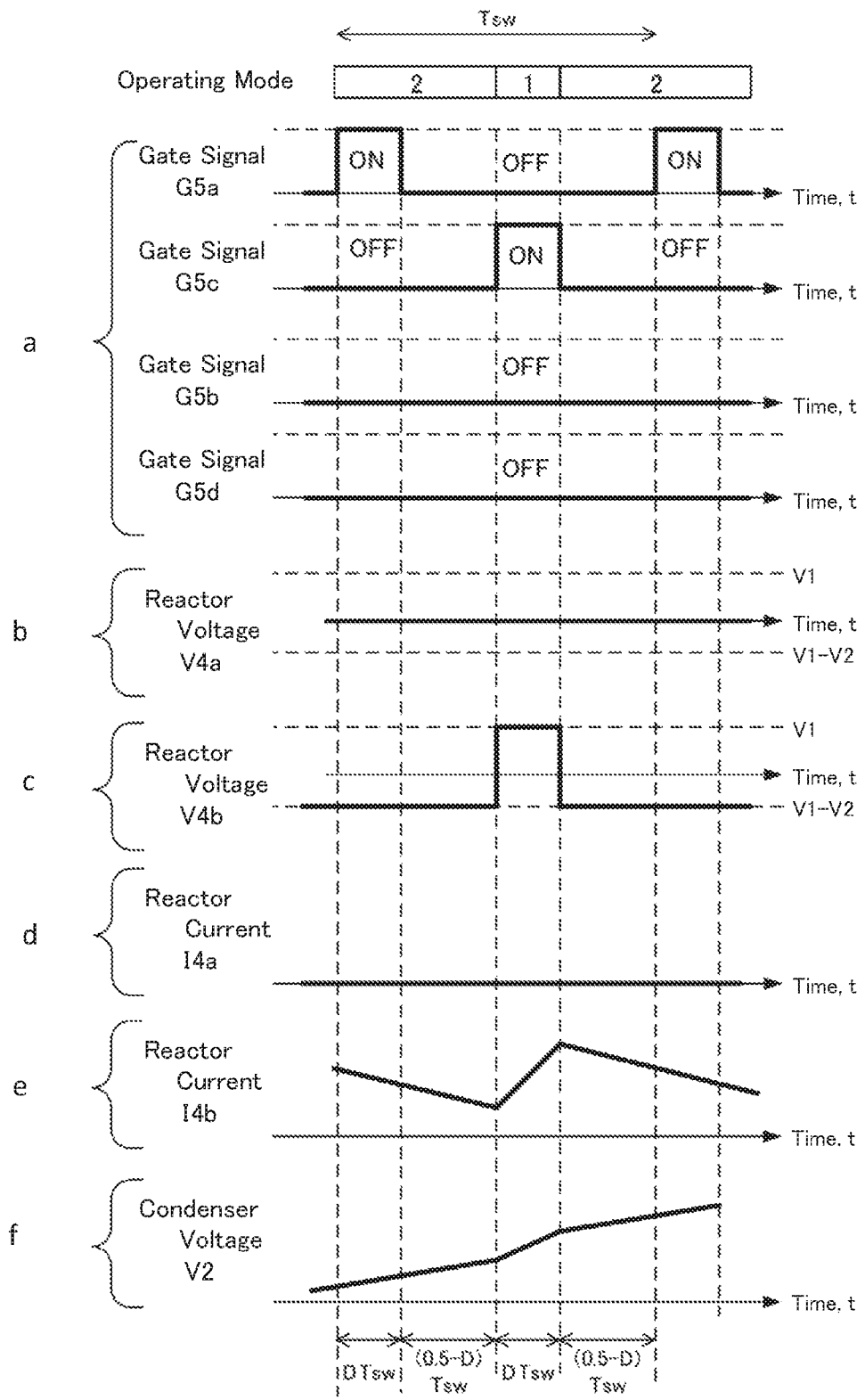
FIG. 5 is a wave form chart showing ideal operating wave forms in the operating modes of the power run operation, in a case where an OFF state keeping abnormality is arisen in the first IGBT element, according to Embodiment 1 of the present application.

FIG. 5 shows ideal operating wave forms, in the case where an OFF state keeping abnormality is caused in the first IGBT element 5a1. As shown in FIG. 5, in the case where the OFF state keeping abnormality is caused in the first IGBT element 5a1, the first IGBT element 5a1 cannot turn on and the current value I4a becomes 0 A. Accordingly, unbalance is arisen between the current value I4a and the current value I4b, and normal operation becomes impossible. At the time of OFF state keeping abnormality in the second IGBT element 5b1, the same state will be generated at the time of regenerative operation. At the times of respective OFF state keeping abnormalities in the third IGBT element 5c1 and the fourth IGBT element 5d1, the difference is only in that the current value I4a and the current value I4b have changes, and the voltage value V4a and the voltage value V4b have changes, with respect to those at times of respective OFF state keeping abnormalities in the first IGBT element 5a1 and the second IGBT element 5b1. As operations are the same with those at the times of respective OFF state keeping abnormalities in the first IGBT element 5a1 and the second IGBT element 5b1, the explanation is omitted.

Further, in the case where an abnormal state is caused in the first current sensor 3a, or in the second current sensor 3b, it is possible to attain a failure decision on the current sensor, based on the fact that current values between binary parallels become unbalanced. Also in the case where an OFF state keeping abnormality is caused in the first to fourth IGBT elements 5a1 to 5d1, current values between the binary parallels become unbalanced, as mentioned above. Accordingly, a behavior, which is similar to that in the case where an abnormal state is caused in a current sensor, is generated, and the failure decision unit will make an erroneous decision that a current sensor is in failure. Consequently, distinguishing between the abnormality in a current sensor and the abnormality in an IGBT element is necessary to perform a failure decision.

FIG. 6 is a flow chart drawing in the failure decision, which is used in Embodiment 1 of the present application. FIG. 7A, FIG. 7B, FIG. 7C, FIG. 7D, FIG. 7E, FIG. 7F, FIG. 7G, and FIG. 7H are circuit diagrams for explaining operating modes at the time of the failure decision, which are used in Embodiment 1 of the present application. Dotted lines, which are drawn in FIG. 7A, FIG. 7B, FIG. 7C, FIG. 7D, FIG. 7E, FIG. 7F, FIG. 7G, and FIG. 7H, represent current pathways.

As shown in FIG. 6, in Step ST0, normal control is continued; in Step ST1, the failure decision unit confirms that unbalance is not caused in current values between the binary parallels, and if the unbalance is not caused, the failure decision unit repeats the control, and continues the detection of the current value and the voltage value. In the case where unbalance is caused in the current values between the binary parallels, in Step ST2, the first IGBT element 5a1 is made to drive. In Step ST3, in the case where the voltage V2 of the second smoothing condenser 6 makes a change in intensity, the first IGBT element 5a1 is in a normal state, and in the case where the voltage V2 does not make a change, in Step ST4 the failure decision unit decides that the first IGBT element 5a1 is in an OFF state keeping abnormality. This determination method uses the fact that, in the case where an OFF state keeping abnormality is caused in the IGBT element, current does not flow through and then, the voltage V2 does not make a change, as mentioned above.

In the case where the voltage V2 of the second smoothing condenser 6 makes a change, in Step ST5, the second IGBT element 5b1 is made to drive. Then, in Step ST6, the failure decision unit decides whether the voltage V2 of the second smoothing condenser 6 makes a change or not, and in the case where the voltage V2 makes a change, the failure decision unit decides that the second IGBT element 5b1 is in a normal state. In the case where the voltage V2 does not make a change, in Step ST7, the failure decision unit decides that an OFF state keeping abnormality is caused in the second IGBT element 5b1. In the case where the second IGBT element 5b1 is in a normal state, in Step ST8, the third IGBT element 5c1 is made to drive. In Step ST9, the failure decision unit checks whether the voltage V2 of the second smoothing condenser 6 makes a change or not. In the case where the voltage V2 is found to make a change, the failure decision unit decides that the third IGBT element 5c1 is in a normal state, and in the case where the voltage V2 is found not to make a change, in Step ST10, the failure decision unit decides that the third IGBT element 5c1 is in an OFF state keeping abnormality. If the abnormality is not found until the checks up to the third IGBT element 5c1, in Step ST11, the fourth IGBT element 5d1 is made to drive, and in Step ST12, the failure decision unit checks whether the second smoothing condenser 6 makes a change or not in voltage. In the case where the voltage V2 is found to make a change, the failure decision unit decides that the fourth IGBT element 5d1 is in a normal state. In the case where the voltage V2 does not make a change, in Step ST13, the failure decision unit decides that an OFF state keeping abnormality is caused in the fourth IGBT element 5d1. If the first to fourth IGBT elements 5a1 to 5d1 are decided to be in a normal state, in Step ST14, the failure decision unit makes a failure decision that a current sensor is in an abnormal state.

Consequently, it becomes possible to distinguish abnormalities in the current sensors from abnormalities in the first to fourth IGBT elements 5a1 to 5d1.

Figure 8:
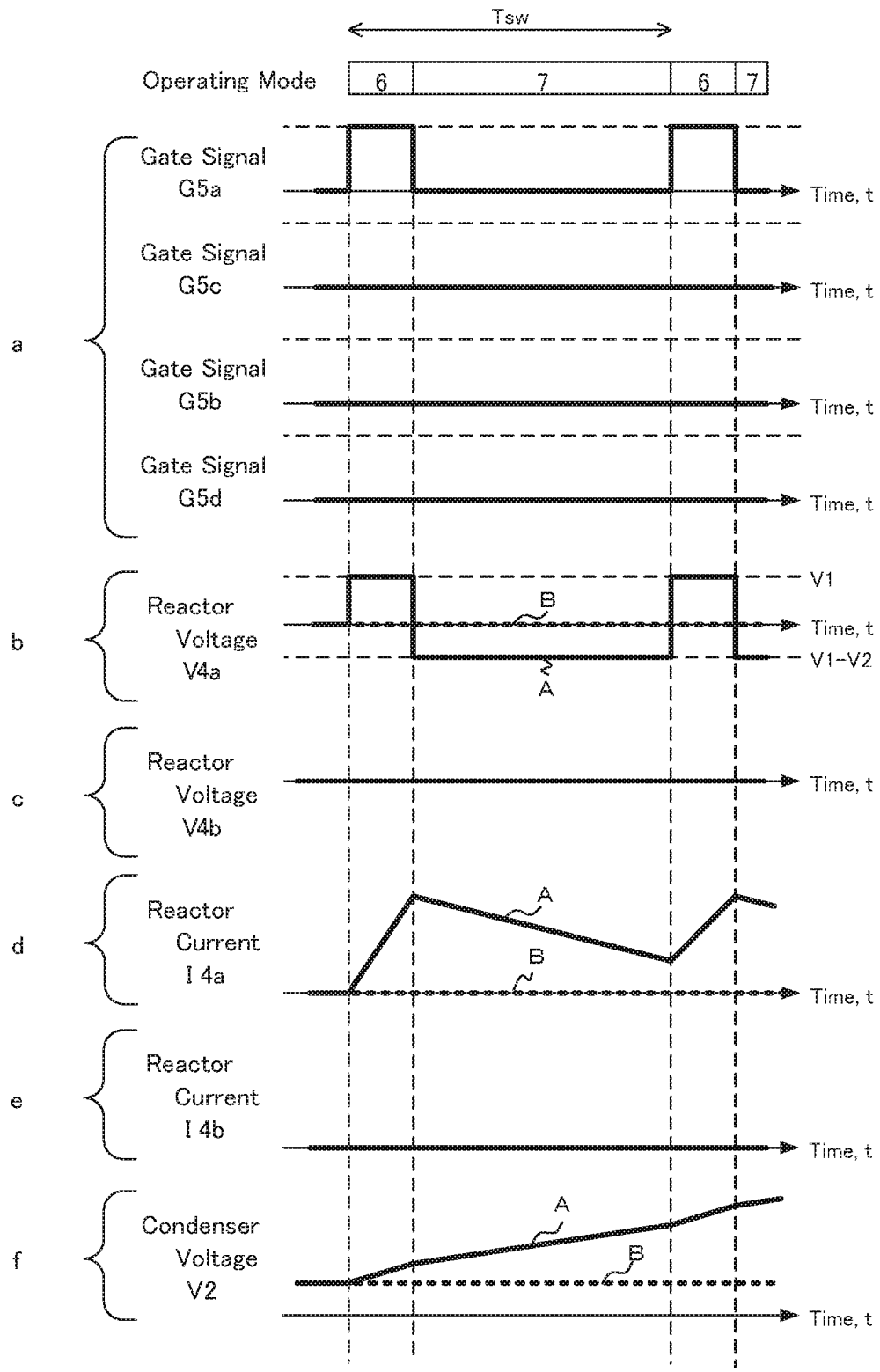
FIG. 8 is a wave form chart showing ideal operating wave forms, in a case where a first IGBT element is made to drive, according to Embodiment 1 of the present application.

FIG. 8 shows ideal operating wave forms, at the time when only the first IGBT element 5a1 is made to drive, and represents relationships among gate signals of the first to fourth IGBT elements 5a1 to 5d1, reactor currents, reactor voltages, and a condenser voltage.

Figure 7A:
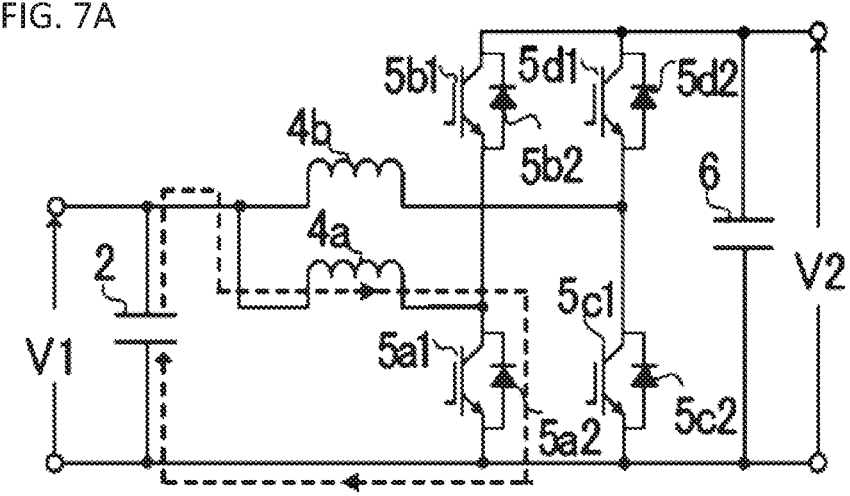
FIG. 7A is a circuit diagram showing a sixth operating mode at the time of the failure decision, according to Embodiment 1 of the present application.

As shown in FIG. 8, the operating mode at the beginning is a sixth operating mode, which is shown in FIG. 7A. In this case, the first IGBT element 5a1 is in on state, and the second IGBT element 5b1, the third IGBT element 5c1, and the fourth IGBT element 5d1 are in off state. As shown in FIG. 7A, the current pathway is a pathway where current passes through the first smoothing condenser 2, the first reactor 4a, the first IGBT element 5a1, and the first smoothing condenser 2, and a voltage V1 is applied to the both ends of the first reactor 4a.

Figure 7B:
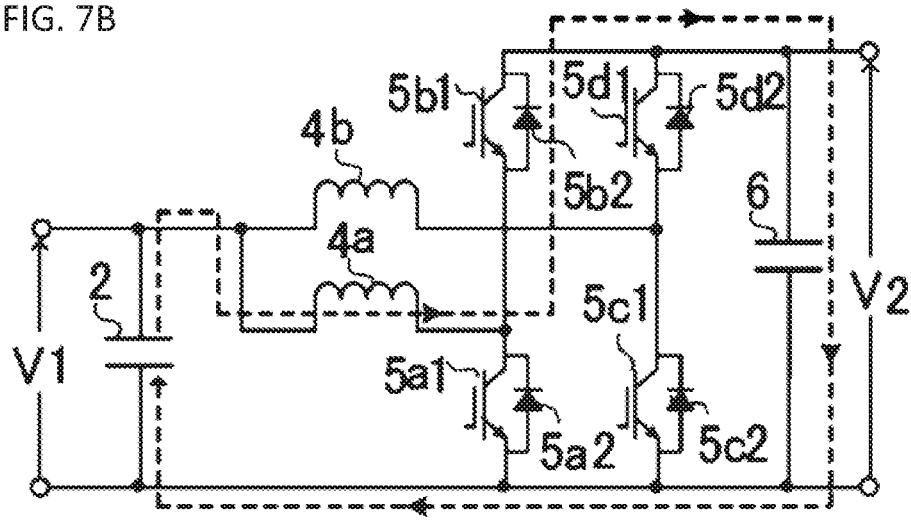
FIG. 7B is a circuit diagram showing a seventh operating mode at the time of the failure decision, according to Embodiment 1 of the present application.

The next operating mode is a seventh operating mode, which is shown in FIG. 7B. In this case, the first to fourth IGBT elements 5a1 to 5d1 are in off state. As shown in FIG. 7B, the current pathway is a pathway where current passes through the first smoothing condenser 2, the first reactor 4a, the second diode 5b2, the second smoothing condenser 6, and the first smoothing condenser 2, and a voltage (V1-V2) is applied to the both ends of the first reactor 4a. If the first IGBT element 5a1 is in a normal state, the voltage V4a, the current I4a, and the voltage V2 make changes, like solid line graphs (A) of FIG. 8. If the first IGBT element 5a1 is in an OFF state keeping abnormality, the first IGBT element does not turn on, and then, the voltage V4a, the current I4a, and the voltage V2 make no changes, like dotted line graphs (B) of FIG. 8. Therefore, it becomes possible to attain a failure decision of the first IGBT element 5a1, by the existence or non-existence of the change in the voltage V2.

Figure 9:
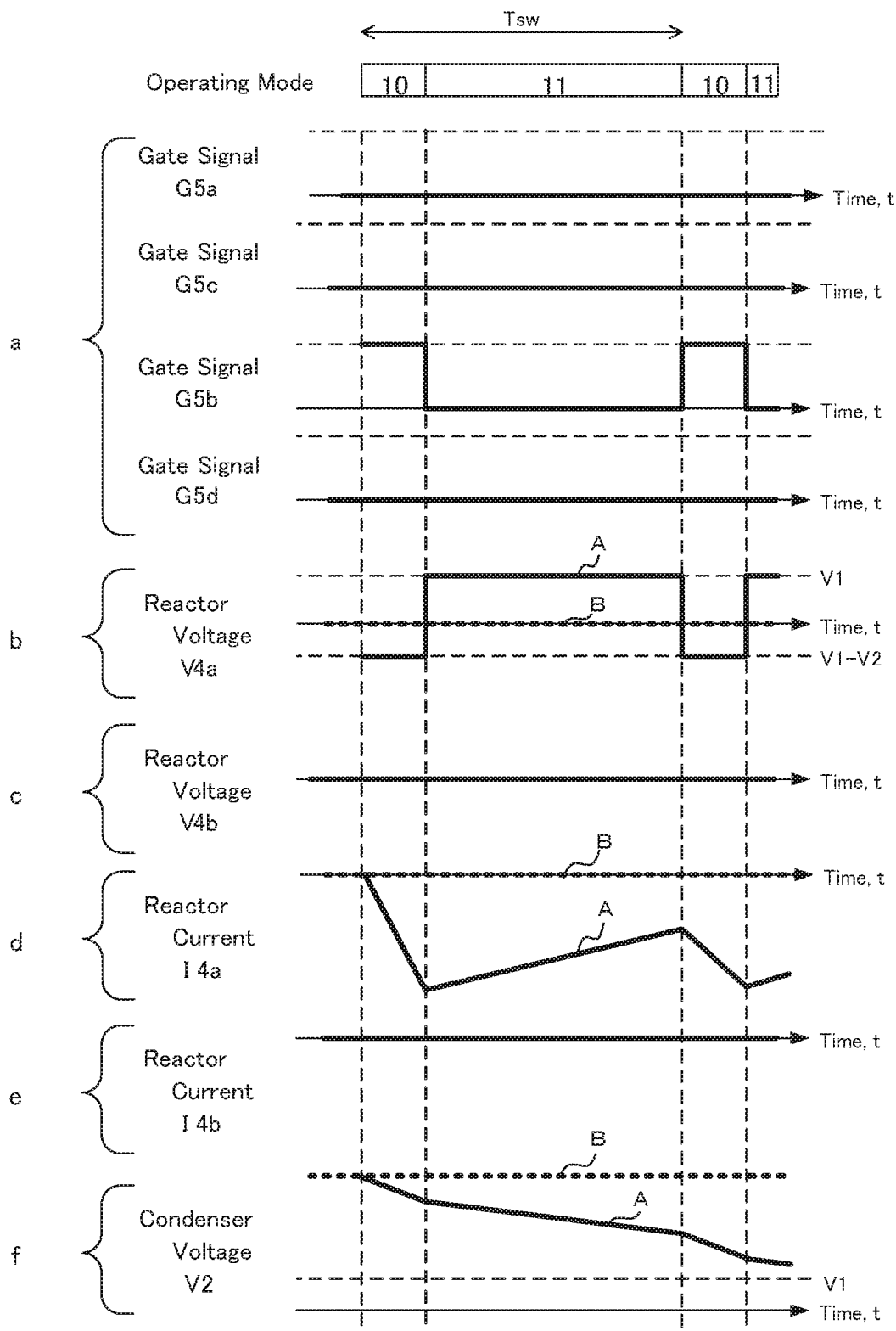
FIG. 9 is a wave form chart showing ideal operating wave forms, in a case where a second IGBT element is made to drive, according to Embodiment 1 of the present application.

FIG. 9 shows ideal operating wave forms, at the time when only the second IGBT element 5b1 is made to drive, and represents the relationships among gate signals, reactor currents, reactor voltages, and a condenser voltage.

Figure 7C:
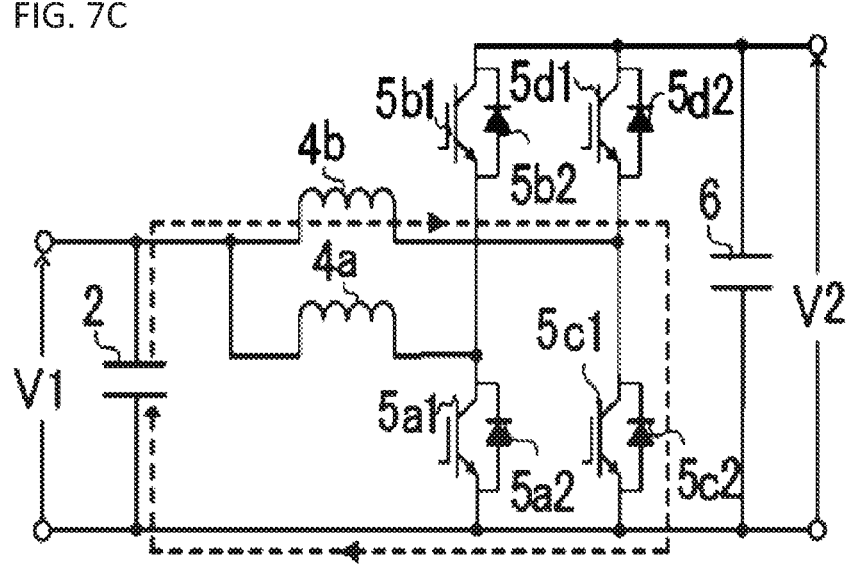
FIG. 7C is a circuit diagram showing an eighth operating mode at the time of the failure decision, according to Embodiment 1 of the present application.

As shown in FIG. 9, the voltage V2 in an initial state is supposed to have a value, which is larger than the voltage V1. Further, the operating mode at the beginning is a tenth operating mode, which is shown in FIG. 7E. In this case, the second IGBT element 5b1 becomes turned on, and the first IGBT element 5a1 and the third IGBT element 5c1 and the fourth IGBT element 5d1 become turned off. The current pathway is a pathway where current passes through the second smoothing condenser 6, the second IGBT element 5b1, the first reactor 4a, the first smoothing condenser 2, and the second smoothing condenser 6, and a voltage (V1-V2) is applied to the both ends of the first reactor 4a.

Figure 7D:
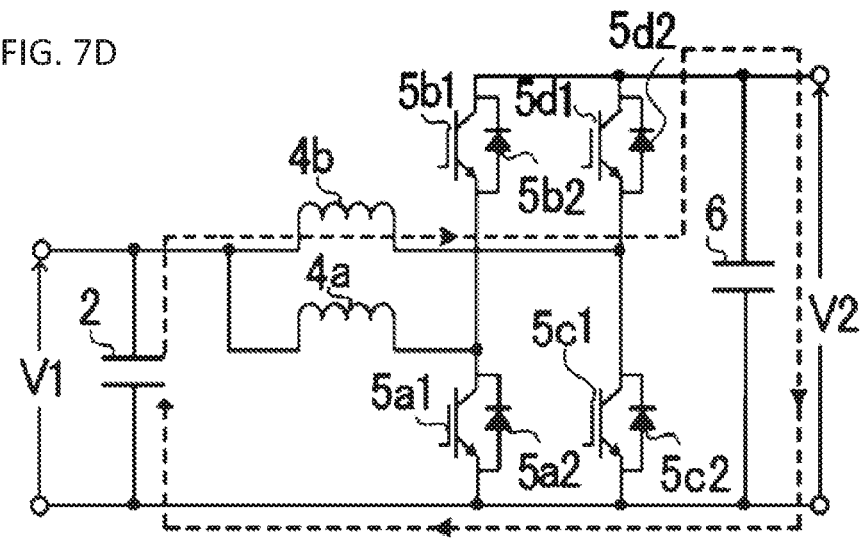
FIG. 7D is a circuit diagram showing a ninth operating mode at the time of the failure decision, according to Embodiment 1 of the present application.
Figure 7E:
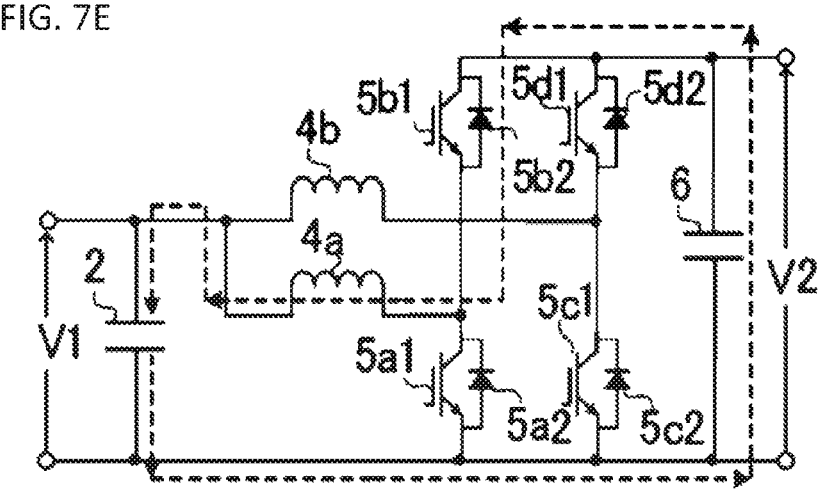
FIG. 7E is a circuit diagram showing a tenth operating mode at the time of the failure decision, according to Embodiment 1 of the present application.
Figure 7F:
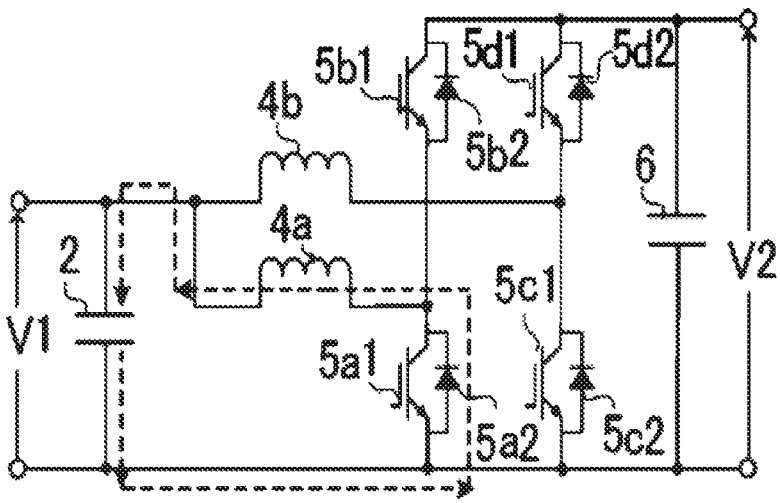
FIG. 7F is a circuit diagram showing an eleventh operating mode at the time of the failure decision, according to Embodiment 1 of the present application.

The next operating mode is an eleventh operating mode, which is shown in FIG. 7F. In this case, the first to fourth IGBT elements 5a1 to 5d1 become turned off. The current pathway is a pathway where current passes through the first reactor 4a, the first smoothing condenser 2, the first diode 5a2, and the first reactor 4a, and a voltage V1 is applied to the both ends of the first reactor 4a. If the second IGBT element 5b1 is in a normal state, the voltage V4a, the current I4a, and the voltage V2 make changes like solid line graphs (A) of FIG. 9. If the second IGBT element 5b1 is in an OFF state keeping abnormality, the second IGBT element does not turn on, and then, the voltage V4a, the current I4a, and the voltage V2 make no changes, like dotted line graphs (B) of FIG. 9. Therefore, it becomes possible to attain a failure decision of the second IGBT element 5b1, by the existence or non-existence of the change in the voltage V2.

Figure 10:
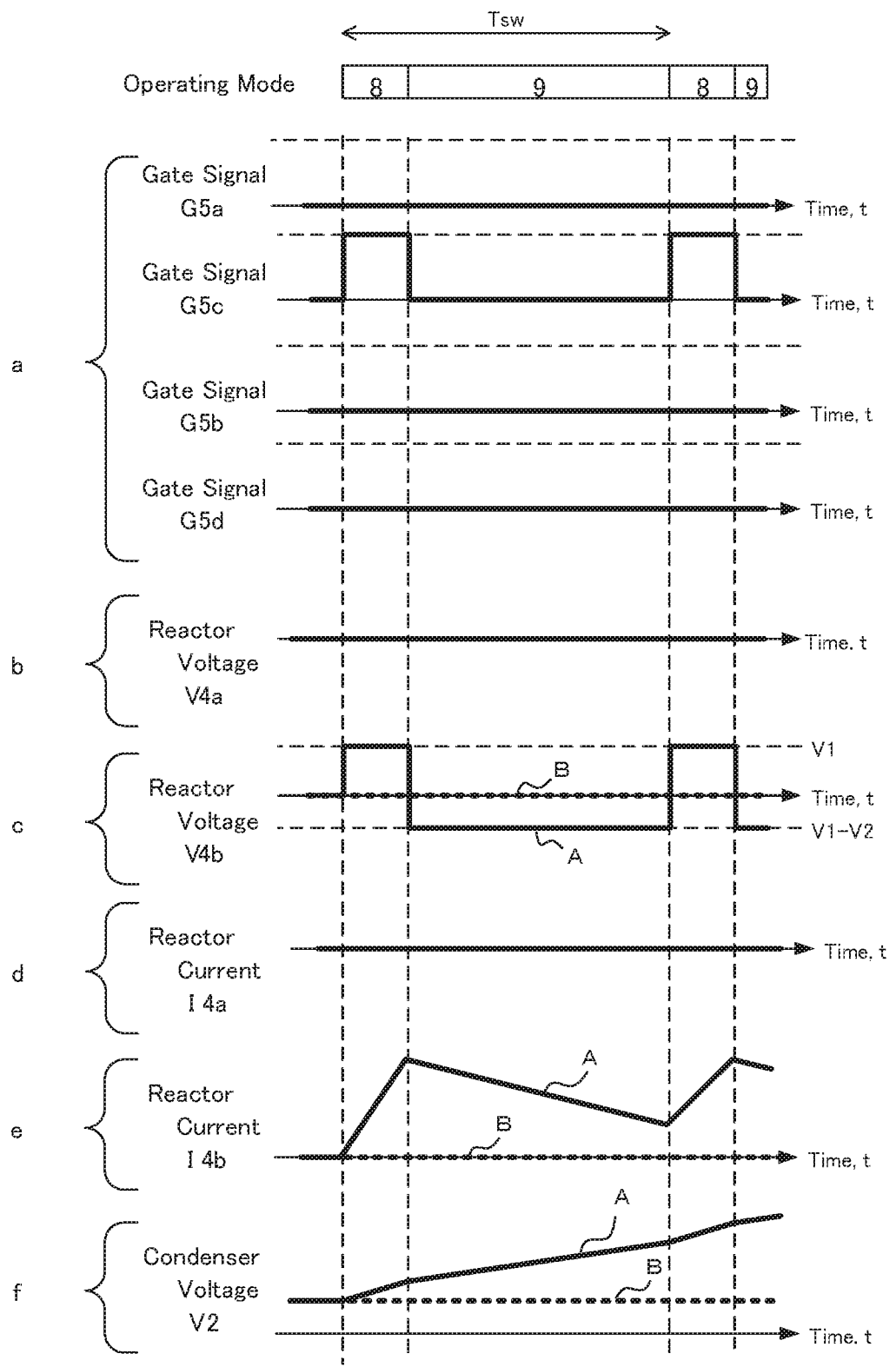
FIG. 10 is a wave form chart showing ideal operating wave forms, in a case where a third IGBT element is made to drive, according to Embodiment 1 of the present application.

FIG. 10 shows ideal operating wave forms at the time when only the third IGBT element 5c1 is made to drive, and represents relationships among gate signals, reactor currents, reactor voltages, and a condenser voltage. As shown in FIG. 10, the operating mode at the beginning is an eighth operating mode, which is shown in FIG. 7C. In this case, the third IGBT element 5c1 becomes turned on, and the first IGBT element 5a1 and the second IGBT element 5b1 and the fourth IGBT element 5d1 become turned off. The current pathway is a pathway where current passes through the first smoothing condenser 2, the second reactor 4b, the third IGBT element 5c1 and the first smoothing condenser 2, and a voltage V1 is applied to the both ends of the second reactor 4b.

The next operating mode is a ninth operating mode, which is shown in FIG. 7D. In this case, the first to fourth IGBT elements 5a1 to 5d1 become turned off. The current pathway is a pathway where current passes through the first smoothing condenser 2, the second reactor 4b, the fourth diode 5d2, the second smoothing condenser 6, and the first smoothing condenser 2, and a voltage (V1-V2) is applied to the both ends of the second reactor 4b. If the third IGBT element 5c1 is in a normal state, the voltage V4b, the current I4b, and the voltage V2 make changes like solid line graphs (A) of FIG. 10. If the third IGBT element 5c1 is in an OFF state keeping abnormality, the third IGBT element does not become turned on, and then, the voltage V4b, the current I4b, and the voltage V2 make no changes, like dotted line graphs (B) of FIG. 10. Therefore, it becomes possible to attain a failure decision of the third IGBT element 5c1, by the existence or non-existence of the change in the voltage V2.

Figure 11:
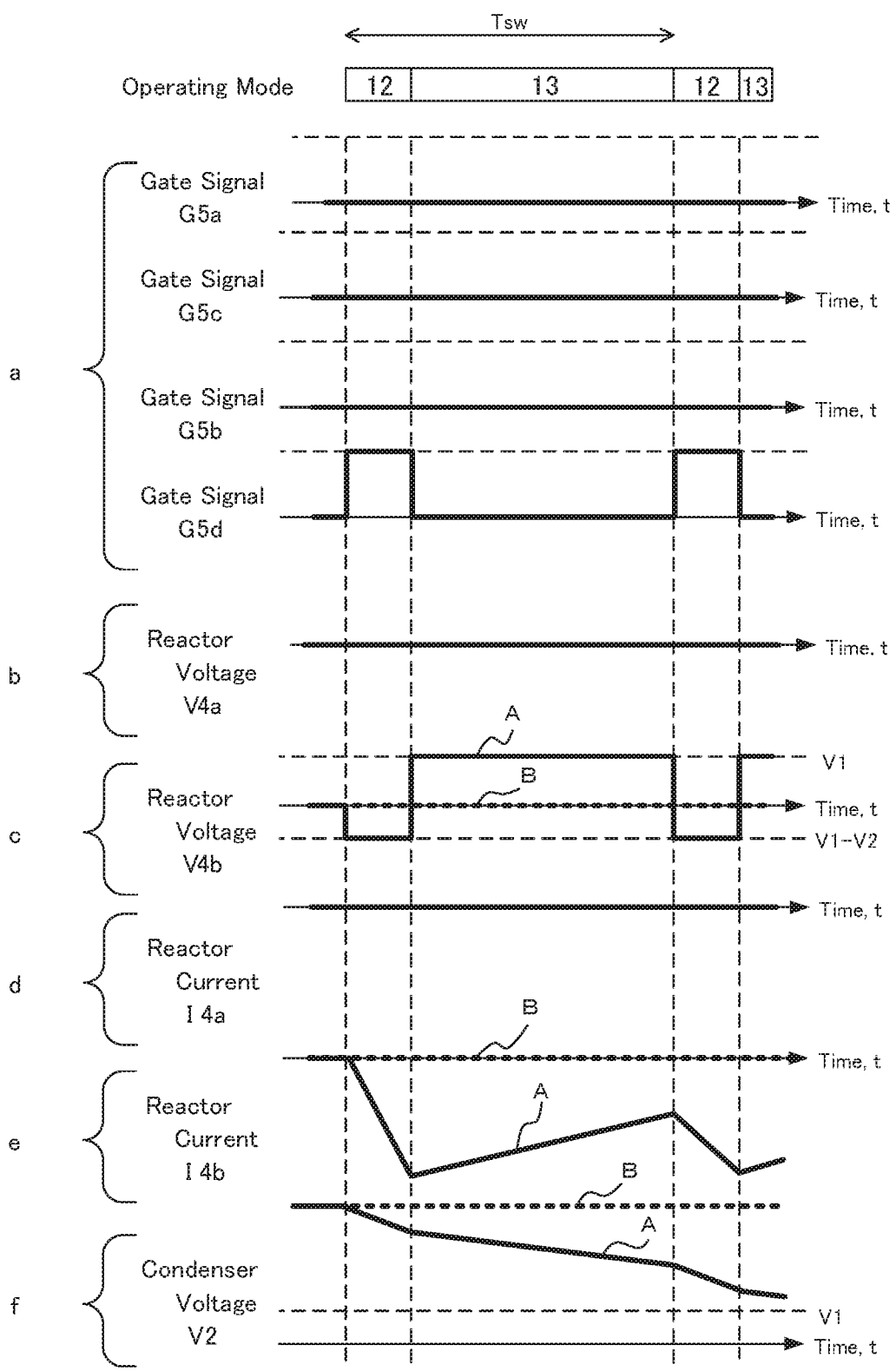
FIG. 11 is a wave form chart showing ideal operating wave forms, in a case where a fourth IGBT element is made to drive, according to Embodiment 1 of the present application.

FIG. 11 shows ideal operating wave forms at the time when only the fourth IGBT element 5d1 is made to drive, and represents the relationships among gate signals, reactor currents, reactor voltages, and a condenser voltage.

Figure 7G:
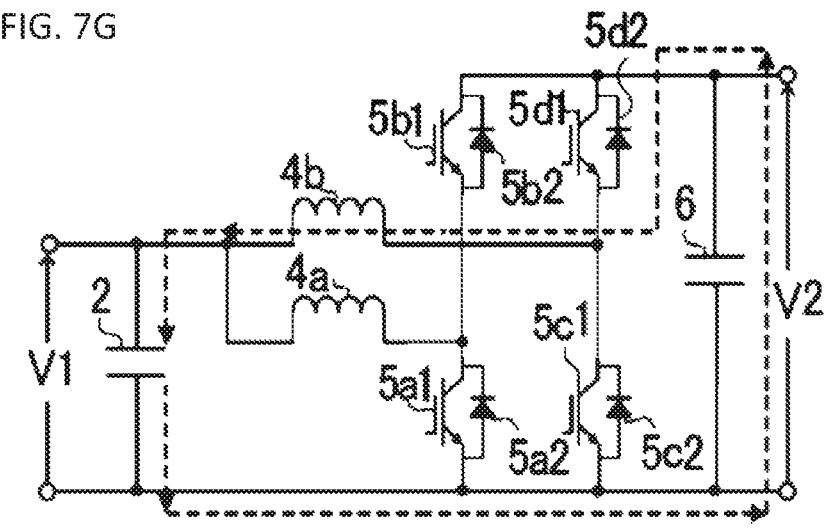
FIG. 7G is a circuit diagram showing a twelfth operating mode at the time of the failure decision, according to Embodiment 1 of the present application.

As shown in FIG. 11, the voltage V2 in an initial state is supposed to have a value, which is larger than the voltage V1. Further, the operating mode at the beginning is a twelfth operating mode, which is shown in FIG. 7G. In this case, the fourth IGBT element 5d1 becomes turned on, and the first to third IGBT elements 5a1 to 5c1 become turned off. The current pathway is a pathway where current passes through the second smoothing condenser 6, the fourth IGBT element 5d1, the second reactor 4b, the first smoothing condenser 2, and the second smoothing condenser 6, and a voltage (V1-V2) is applied to the both ends of the second reactor 4b.

Figure 7H:
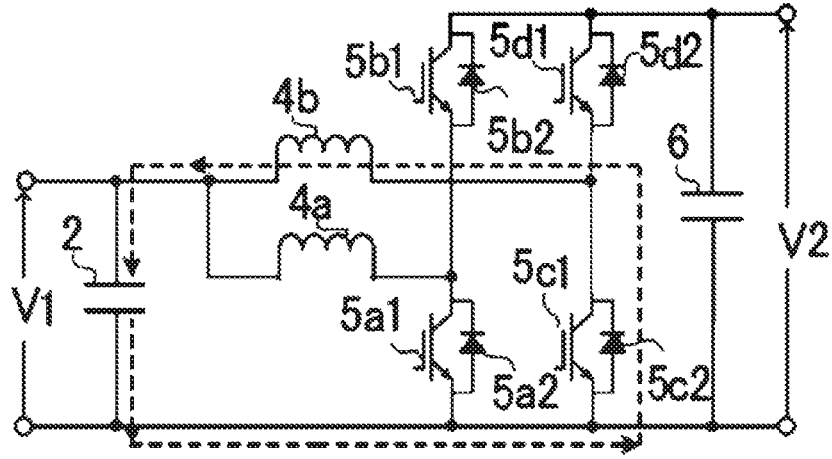
FIG. 7H is a circuit diagram showing a thirteenth operating mode at the time of the failure decision, according to Embodiment 1 of the present application.

The next operating mode is a thirteenth operating mode, which is shown in FIG. 7H. In this case, the first to fourth IGBT elements 5a1 to 5d1 become turned off. The current pathway is a pathway where current passes through the second reactor 4b, the first smoothing condenser 2, the third diode 5c2, and the second reactor 4b, and a voltage V1 is applied to the both ends of the second reactor 4b. If the fourth IGBT element 5d1 is in a normal state, the voltage V4b, the current I4b, and the voltage V2 make changes like solid line graphs (A) of FIG. 11. If the fourth IGBT element 5d1 is in an OFF state keeping abnormality, the fourth IGBT element 5d1 does not become turned on, and then, the voltage V4b, the current I4b, and the voltage V2 make no changes, like dotted line graphs (B) of FIG. 11. Therefore, it becomes possible to attain a failure decision of the fourth IGBT element 5d1, by the existence or non-existence of the change in the voltage V2.

In the case where an OFF state keeping abnormality is caused in the first IGBT element 5a1 or in the third IGBT element 5c1, current cannot flow through the first reactor 4a or the second reactor 4b in the power run operation, and normal operation is not possible. In the regenerative operation, however, normal operation becomes possible, because the first IGBT element 5a1 and the third IGBT element 5c1 are not used. In the power run operation, normal operation is possible, even in the case where an OFF state keeping abnormality is caused in the second IGBT element 5b1 or in the fourth IGBT element 5d1, because the second IGBT element 5b1 and the fourth IGBT element 5d1 are not used.

Consequently, performing the before mentioned operations makes it possible to specify a part where an OFF state keeping abnormality of the first to fourth IGBT elements 5a1 to 5d1 is caused, and it becomes possible to continue the transmission of electric power using normal state IGBT elements.

It is to be noted that, in the power conversion device 100 according to Embodiment 1, a case where IGBTs (Insulated Gate Bipolar Transistors) are used as the first to fourth IGBT elements 5a1 to 5d1 is explained. However, even in a case where switching elements employ MOSFETs (Metal Oxide Semiconductor Field Effect Transistors), similar effects as in Embodiment 1 will be obtained.

Further, although in Embodiment 1, explanation is given about a case where an uncombined type reactor is employed as a reactor of the power conversion device 100, similar effects as in Embodiment 1 will obtained, even in a case where the reactor employs a combined type reactor.

Further, in Embodiment 1, in the failure decision of current sensors and IGBT elements, first driving is made to the first IGBT element 5a1, in a case where unbalance is caused in current values between the binary parallels. However, it is allowed to drive any IGBT element at first, and the IGBT elements may be made to drive in any order.

Further, in Embodiment 1, there is shown a case where a current sensor is connected between a reactor and the positive electrode of the first smoothing condenser 2. However, similar effects as in Embodiment 1 will be obtained, even if the current sensors are connected to the places where a first current and a second current which flow through the first reactor 4a and the second reactor 4b respectively, can be detected.

Embodiment 2

In FIG. 1 to FIG. 11, arrangements between the first smoothing condenser 2 and the second smoothing condenser 6 are in binary parallel constitution. In Embodiment 2, however, a case of trinary parallel constitution will be explained.

Figure 12:
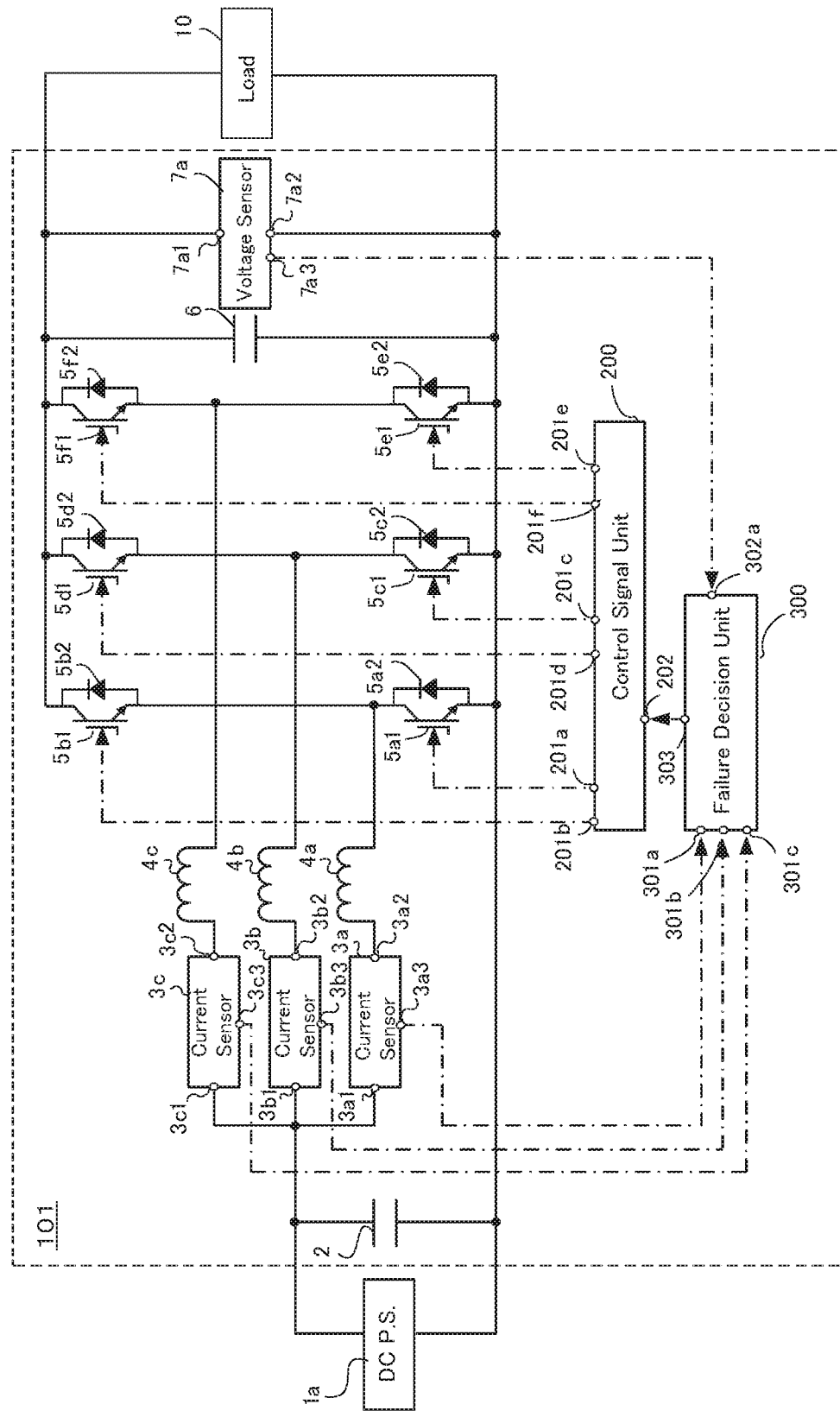
FIG. 12 is a circuit diagram showing a power conversion device, according to Embodiment 2 of the present application.

FIG. 12 is a circuit diagram of a power conversion device 101 in the trinary parallel constitution, for explaining Embodiment 2. In the case of trinary parallel constitution, added component parts, as those which are different from in binary parallel constitution, are a third current sensor 3c, a third reactor 4c; as a fifth voltage conversion unit, a fifth IGBT element 5e1 and a fifth diode 5e2, which is in inverse parallel connection with the fifth IGBT element 5e1; and as a sixth voltage conversion unit, a sixth IGBT element 5f1 and a sixth diode 5f2, which is in inverse parallel connection with the sixth IGBT element 5f1. That is to say, a state is created where three current sensors are connected.

The third current sensor 3c, the third reactor 4c, the fifth IGBT element 5e1, and the sixth IGBT element 5f1, which are added, achieve functions similar to those of the parts in the binary parallel constitution.

In the description below, explanation is made about the connection of the added parts. The third current sensor 3c includes a terminal 3c1, which is connected to the positive electrode of the first smoothing condenser 2 and the terminal 3a1 of the first current sensor 3a; and a terminal 3c2, which is connected to, via the third reactor 4c, the collector terminal of the fifth IGBT element 5e1 and the emitter terminal of the sixth IGBT element 5f1. The emitter terminal of the fifth IGBT element 5e1 is connected to the negative electrode of the first smoothing condenser 2, and the collector terminal of the sixth IGBT element 5f1 is connected to the positive electrode of the second smoothing condenser 6. A terminal 201e of the control signal unit 200 is connected to the gate terminal of the fifth IGBT element 5e1, and a terminal 201f of the control signal unit 200 is connected to the gate terminal of the sixth IGBT element 5f1. A terminal 301c of the failure decision unit 300 is connected to the terminal 3c3 of the third current sensor 3c.

In the power conversion device 101 of Embodiment 2, two operations, a power run operation and a regenerative operation, are present in a steady state. Compared with the power conversion device 100 of Embodiment 1, the power conversion device 101 of Embodiment 2 is different only in that the number of parallel connections in a circuit is increased. Accordingly, the operation in a steady state and the behavior at the time of OFF state keeping abnormality are the same as those of the power conversion device 100 of Embodiment 1, and then, the explanation is omitted.

In the power conversion device 101 of Embodiment 2, failure decisions are carried out on the first to sixth IGBT elements 5a1 to 5f1 and the current sensors, in the case where unbalance is caused in the current values among parallel elements. Moreover, it becomes possible to specify a sensor which is in a fault condition, from among the first to third current sensors 3a to 3c.

In the description below, explained is a way how to specify a current sensor which is in a fault condition, out of the first to third current sensors 3a to 3c. Differences are taken each other in current values I3a to I3c of the first to third current sensors 3a to 3c, and are represented as Equations (1) to (3).

$$|I3a-I3b|=I3ab \quad (1)$$

$$|I3a-I3c|=I3ac \quad (2)$$

$$|I3b-I3c|=I3bc \quad (3)$$

Among the first to third current sensors 3a to 3c, a current sensor which is in a fault condition differs from other normal state current sensors in current value. For example, in the case where the first current sensor 3a is in a fault condition, a difference I3ab and a difference I3ac become larger values than a difference I3bc, because the current value I3a is different from other current values.

It is to be noted that, even in the case where the second current sensor 3b or the third current sensor 3c is in a fault condition, similar explanation can be made.

Further, in the case where the power conversion device 101 of Embodiment 2 employs switching elements of MOSFETs to the first to sixth IGBT elements 5a1 to 5f1, similar effects as those of Embodiment 2 can be obtained.

Further, in Embodiment 2, there is shown a case where an uncombined type reactor is employed to the reactor of the power conversion device 101. However, similar effects can be obtained, even if a reactor of combined type is employed.

Further, there is shown a case where the current sensors of Embodiment 2 are connected between the reactors and the positive electrodes of the first smoothing condenser 2. However, similar effects can be obtained, even if respective current sensors are connected to the places where a first current, a second current, and a third current, which flow through the first reactor 4a, the second reactor 4b, and the third reactor 4c respectively, can be detected.

Further, in Embodiment 2, explanation is made about a power conversion device 101 of trinary parallel constitution. However, similar effects can be obtained also in a power conversion device of N-nary parallel constitution, where N denotes a natural number equal to or larger than 3. That is to say, in the case where three or more current sensors are connected and the switching elements are decided to be in a normal state, it becomes possible to specify that a first current sensor having a value which is deviated from other first current sensors is in an abnormal state.

Embodiment 3

Figure 13:
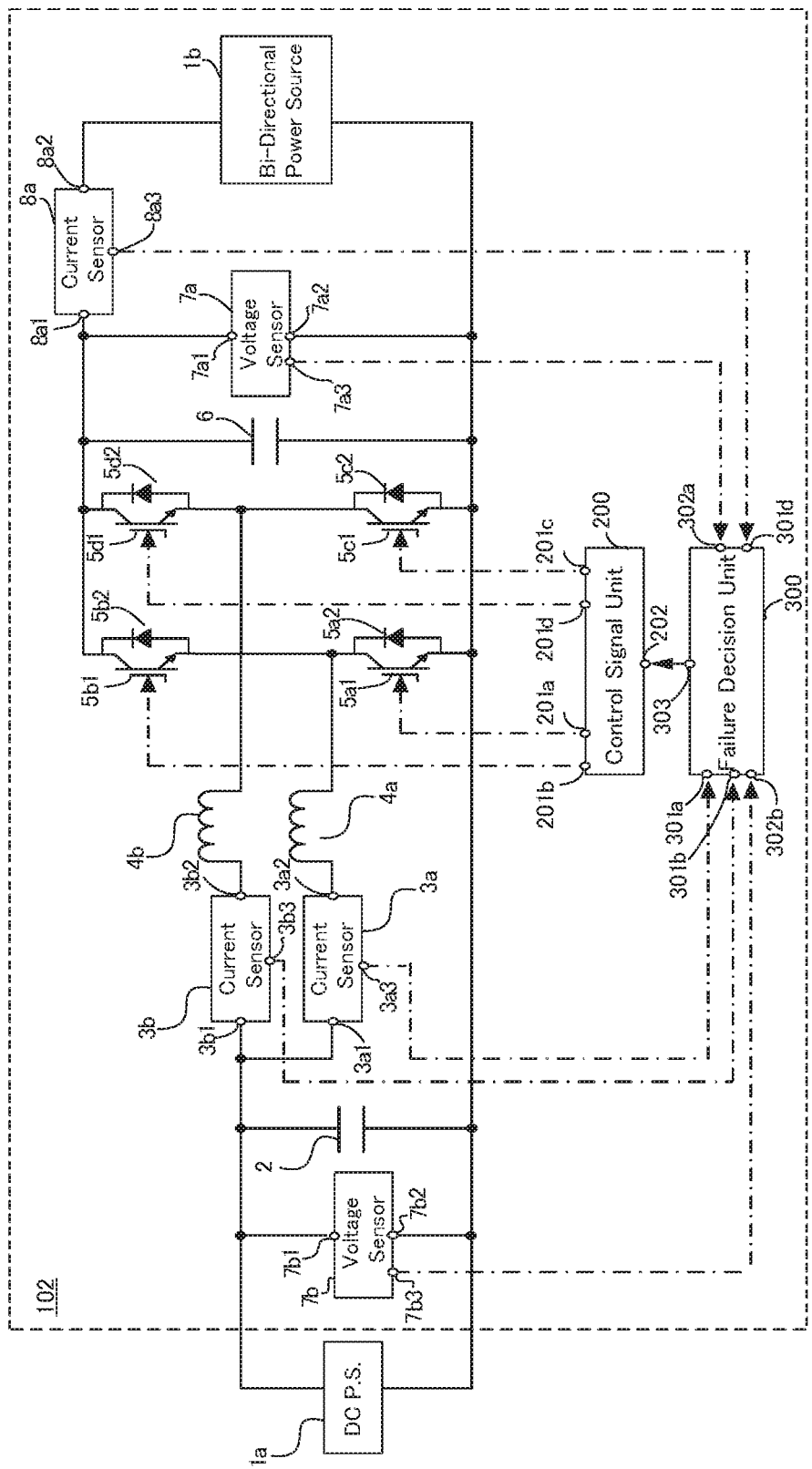
FIG. 13 is a circuit diagram showing a power conversion device, according to Embodiment 3 of the present application.

Next, explanation is made about Embodiment 3. FIG. 13 is a circuit diagram of a power conversion device 102 in accordance with Embodiment 3.

As shown in FIG. 13, the power conversion device 102 according to Embodiment 3, in addition to the components of the power conversion device 100 according to Embodiment 1, employs additionally a second voltage sensor 7b which detects the voltage V1 at the both ends of the first smoothing condenser 2, a bi-directional power source 1b, and a fourth current sensor 8a which detects a current I1b flowing through the bi-directional power source 1b. Here, the bi-directional power source 1b is a single unit power source, which functions as a power source when performing the power run operation, and functions as a load when performing the regenerative operation.

Explanation will be made about the connection of added components. A terminal 7b1 of the second voltage sensor 7b is connected to the positive electrode of the first smoothing condenser 2; and a terminal 7b2 of the sensor is connected to the negative electrode of the condenser. One end of the bi-directional power source 1b is connected to a terminal 8a2 of the fourth current sensor 8a, and the other end of the power source is connected to the negative electrode of the second smoothing condenser 6. A terminal 8a1 of the fourth current sensor 8a is connected to the positive electrode of the second smoothing condenser 6. An input terminal 301d of the failure decision unit 300 is connected to the output terminal 8a3 of the fourth current sensor 8a, and the output terminal 7b3 of the second voltage sensor 7b is connected to the input terminal 302b of the failure decision unit.

According to Embodiment 3, it is possible to distinguish failures in the current sensors from failures in the first to fourth IGBT elements 5a1 to 5d1, and moreover, it is possible to distinguish a failure in the first current sensor 3a from a failure in the second current sensor 3b, based on the values of respective types of sensors.

Explained next is a way how to distinguish between a failure of the first current sensor 3a and a failure of the second current sensor 3b. Supposing that an electric power from the first smoothing condenser 2 is W1, a detected value of the second voltage sensor 7b is V1, a detected value of the first current sensor 3a is I3a, and a detected value of the second current sensor 3b is I3b, the electric power W1 from the first smoothing condenser 2 will be expressed as Equation (4).

$$W1=V1\times(I3a+I3b) \quad (4)$$

Further, supposing that an electric power to the second smoothing condenser 6 is W2, a detected value of the first voltage sensor 7a is V2, and a detected value of the fourth current sensor 8a is I8a, the electric power W2 to the second smoothing condenser 6 will be expressed as Equation (5).

$$W2=V2\times I8a \quad (5)$$

Because the electric power W1 from the first smoothing condenser 2 and the electric power W2 to the bi-directional power source 1b become equivalent in value, the relation between the two is represented as Equation (6).

$$(I3a+I3b)=V2\times I8a/V1 \quad (6)$$

In the case where the rate between the current I3a and the current I3b can be assumed, the relation between the two is represented as Equation (7), using a coefficient y.

$$I3a=y\times I3b \quad (7)$$

From Equation (6) and Equation (7), I3a can be represented by Equation (8) and I3b can be represented by Equation (9).

$$I3a=V2\times I8a/V1\times y/(1+y) \quad (8)$$

$$I3b=V2\times I8a/V1/(1+y) \quad (9)$$

If there is deviation in value between an I3a estimated value which is calculated from Equation (8) and a detected value I3a of the first current sensor 3a, it can be found that the first current sensor 3a is out of order. If there is deviation in value between an I3b estimated value which is calculated from Equation (9) and a detected value I3b of the second current sensor 3b, it can be found that the second current sensor 3b is out of order. That is to say, in the case where the first to fourth IGBT elements 5a1, 5b1, 5c1, and 5d1 are decided to be in a normal state, the electric power W1 supplied from the first smoothing condenser 2 and the electric power W2 to the bi-directional power source 1b are measured. Accordingly, it becomes possible to specify one or more current sensors to be in an abnormal state, according to the deviation level of the current value which is detected by the current sensor, with respect to a current value assumed based on the measured values. It is to be noted that, a current sensor which is in an abnormal state can be specified based on a calculated electric power value, instead of measuring the electric power, where the electric power value is calculated based on a voltage value detected by the voltage sensor and a current value detected by the current sensor, as shown in Equation (5), which is mentioned before.

It is to be noted that, although in Embodiment 3, explanation is made about a power conversion device 102 of binary parallel constitution, similar effects as those of Embodiment 3 can be obtained also in a power conversion device of N-nary parallel constitution, where N denotes a natural number equal to or larger than two.

Further, explanation is made about a case where current sensors are connected to all of the binary parallels in the power conversion device 102 according to Embodiment 3. However, similar effects as in Embodiment 3 can be obtained, even if at least one current sensor is connected to.

Further, description is made about a case where the first to fourth IGBT elements 5a1 to 5d1 are employed in the power conversion device 102 according to Embodiment 3. However, similar effects can be obtained, even if MOSFETs are employed as switching elements.

Further, in Embodiment 3, there is shown a case where an uncombined type reactor is used to the reactor of the power conversion device 102. However, similar effects can be obtained, even if a reactor of combined type is used.

Further, explanation is made about a case where the current sensors of Embodiment 3 are connected between the reactors and the positive electrode of the first smoothing condenser 2. However, similar effects can be obtained, even if the current sensors are connected to the places where a first current and a second current, which flow through the first reactor 4a and the second reactor 4b respectively, can be detected.

Embodiment 4

Figure 14:
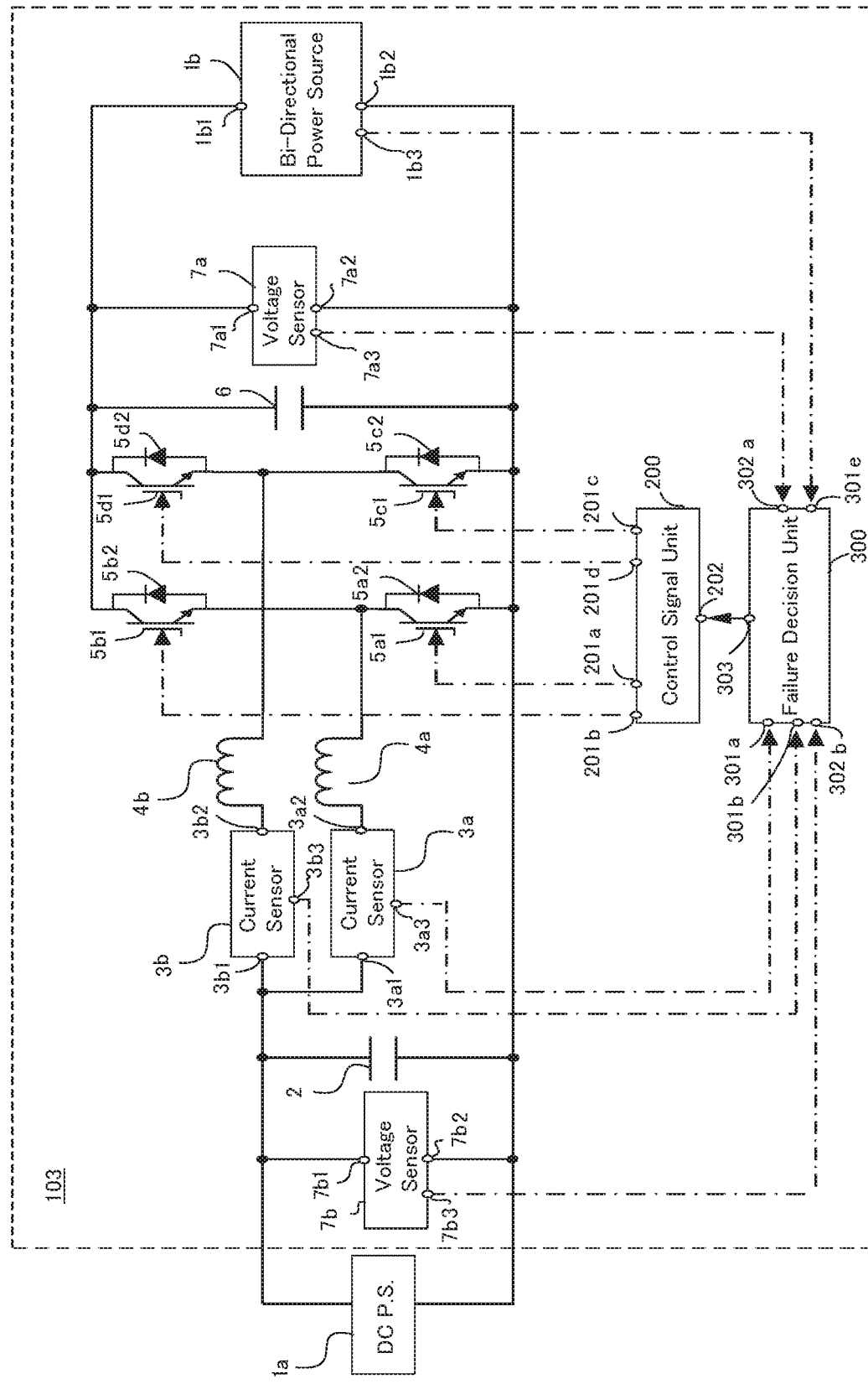
FIG. 14 is a circuit diagram showing a power conversion device, according to Embodiment 4 of the present application.

Next, explanation will be made about Embodiment 4. FIG. 14 is a circuit diagram of a power conversion device 103 in accordance with Embodiment 4.

As shown in FIG. 14, the power conversion device 103 according to Embodiment 4 makes it possible to calculate an estimated value in current, by sending information of the electric power to the bi-directional power source 1b, from the terminal 1b3 of the bi-directional power source 1b to the terminal 301e of the failure decision unit 300, where the fourth current sensor 8a is deleted, compared with the power conversion device 102 according to Embodiment 3.

The power conversion device 103 according to Embodiment 4 differs in the following points, compared with the power conversion device 102 according to Embodiment 3. That is to say, one point is that a terminal 1b1 of the bi-directional power source 1b is connected to the terminal 7a1 of the first voltage sensor 7a, and the other point is that a terminal 1b3 of the bi-directional power source 1b is connected to the terminal 301e of the failure decision unit 300.

In the description below, explanation will be made about the calculation of an estimated value. By inserting Equation (5) into Equation (8) and Equation (9), Equation (10) on the current I3a and Equation (11) on the current I3b, which both use the electric power W2, will be represented.

$$I3a = W2/V1 \times y/(1+y) \quad (10)$$

$$I3b = W2/V1/(1+y) \quad (11)$$

If there is deviation in the value between an I3a estimated value which is calculated from Equation (10) and a detected value I3a of the first current sensor 3a, it can be found that the first current sensor 3a is out of order. If there is deviation in the value between an I3b estimated value which is calculated from Equation (11) and a detected value I3b of the second current sensor 3b, it can be found that the second current sensor 3b is out of order.

It is to be noted that, although explanation in Embodiment 4 is made about the power conversion device 103 of binary parallel constitution, similar effects as those of Embodiment 4 are obtained also with the power conversion device of N-nary parallel constitution, where N denotes a natural number equal to or larger than two.

Further, in Embodiment 4, explanation of the power conversion device 103 is made about a case where current sensors are connected to all of the binary parallels. However, similar effects can be obtained, even if at least one current sensor is connected to.

Further, there is shown a case where the first to fourth IGBT elements 5a1 to 5d1 are employed in the power conversion device 103 of Embodiment 4. However, similar effects can be obtained, even if MOSFETs are employed as switching elements.

Further, in Embodiment 4, there is shown a case where an uncombined type reactor is employed to the reactor of the power conversion device 103. However, similar effects can be obtained, even if a reactor of combined type is employed.

Further, in Embodiment 4, there is shown a case where current sensors are connected between the reactors and the positive electrode of the first smoothing condenser 2. However, similar effects as in Embodiment 4 can be obtained, even if the current sensors are connected to the places where a first current and a second current, which flow through the first reactor 4a and the second reactor 4b respectively, can be detected.

Figure 15:
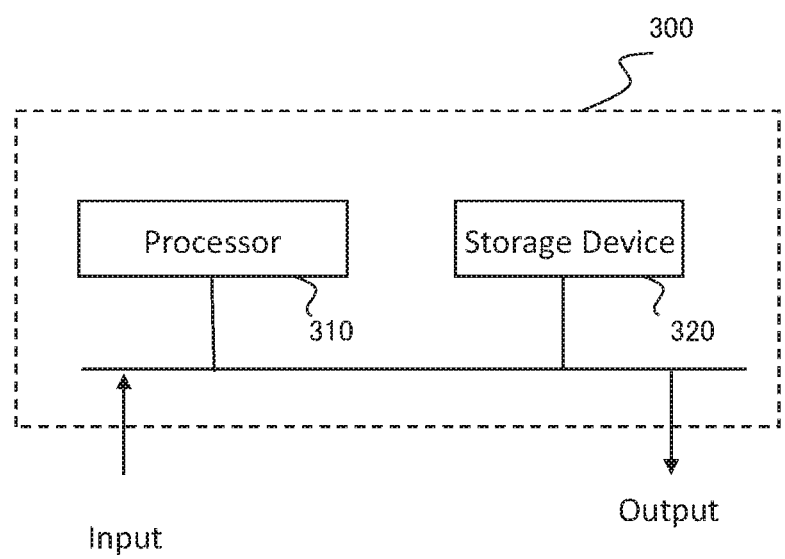
FIG. 15 is a configuration diagram showing a configuration of the hardware, in a failure decision unit of the present application.

It is to be noted that, the failure decision unit 300 is composed of a processor 310 and a storage device 320, as FIG. 15 shows an example of the hardware. The storage device 320, which is not shown in the detail, is provided with volatile memory devices, such as random access memories, and nonvolatile auxiliary storage devices, such as flash memories. Further, the storage device 320 is provided with auxiliary storage devices of hard disks, instead of flash memories. The processor 310 executes a program which is input from the storage device 320. In this case, the program is input into the processor 310, via volatile memory devices, from auxiliary storage devices. Further, the processor 310 is allowed to output data of calculated results and others to the volatile memory devices of the storage device 320, and is also allowed to save the data, via the volatile memories, in the auxiliary storage device.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A power conversion device, which is to be placed between an input power source and a load, the power conversion device comprising;
    a first smoothing condenser, which is connected in parallel to the input power source,
    a second smoothing condenser, which is connected in parallel to the load and has a negative electrode connected to a negative electrode of the first smoothing condenser,
    a plurality of voltage converter, which are provided between the first smoothing condenser and the second smoothing condenser and convert voltage by operations of switching elements,
    a first current sensor, which detects current flowing through the switching element in the voltage converter,
    a first voltage sensor, which detects voltage of the second smoothing condenser,
    a control signal device, which performs drive-control of the switching elements, and
    a failure decision device, which, in a case where a value calculated based on a detected value of the first current sensor deviates from a predetermined value, decides that the first current sensor is in an abnormal state based on a value of the first voltage sensor.

2. The power conversion device as set forth in claim 1,
wherein, the failure decision device, in the case where the value calculated based on the detected value of the first current sensor deviates from the predetermined value,
    drives one by one a switching element in the voltage converter, and
    decides that a drive-targeted switching element is in an abnormal state, in a case where there is no voltage change in the second smoothing condenser, and
    decides that the first current sensor is in an abnormal state, if none of the switching elements in the voltage converter are decided to be in an abnormal state.

3. The power conversion device as set forth in claim 2,
wherein the load is a bi-directional power source which is to be connected in parallel to the second smoothing condenser.

4. The power conversion device as set forth in claim 3,
further comprising:
    a second current sensor, which detects current flowing through the bi-directional power source, and
    a second voltage sensor, which detects voltage of the first smoothing condenser,
    wherein, in a case where the switching elements are decided to be in a normal state,
    the failure decision device specifies that a first current sensor is in a fault condition, which represented a deviated detected value with respect to an estimated value of the first current sensor, where the estimated value is calculated based on a detected value by the second voltage sensor, a detected value by the first voltage sensor, and a detected value by the second current sensor.

5. The power conversion device as set forth in claim 4, wherein the failure decision device, in a case where three or more first current sensors are connected thereto and the switching elements are decided to be in a normal state, specifies that a first current sensor is in an abnormal state, whose value is deviated from values of other first current sensors.

6. The power conversion device as set forth in claim 3, wherein the failure decision device specifies that a first current sensor is in an abnormal state, according to a deviation level of the detected value by the first current sensor, with respect to a current value estimated based on a measured value of electric power to the bi-directional power source and a measured value of electric power supplied from the first smoothing condenser.

7. The power conversion device as set forth in claim 3, wherein the failure decision device, in a case where three or more first current sensors are connected thereto and the switching elements are decided to be in a normal state, specifies that a first current sensor is in an abnormal state, whose value is deviated from values of other first current sensors.

8. The power conversion device as set forth in claim 2, wherein the failure decision device, in a case where three or more first current sensors are connected thereto and the switching elements are decided to be in a normal state, specifies that a first current sensor is in an abnormal state, whose value is deviated from values of other first current sensors.

9. The power conversion device as set forth in claim 1, wherein the load is a bi-directional power source which is to be connected in parallel to the second smoothing condenser.

10. The power conversion device as set forth in claim 9, further comprising:
a second current sensor, which detects current flowing through the bi-directional power source, and
a second voltage sensor, which detects voltage of the first smoothing condenser,
wherein, in a case where the switching elements are decided to be in a normal state,
the failure decision device specifies that a first current sensor is in a fault condition, which represented a deviated detected value with respect to an estimated value of the first current sensor, where the estimated value is calculated based on a detected value by the second voltage sensor, a detected value by the first voltage sensor, and a detected value by the second current sensor.

11. The power conversion device as set forth in claim 10, wherein the failure decision device, in a case where three or more first current sensors are connected thereto and the switching elements are decided to be in a normal state, specifies that a first current sensor is in an abnormal state, whose value is deviated from values of other first current sensors.

12. The power conversion device as set forth in claim 9, wherein the failure decision device specifies that a first current sensor is in an abnormal state, according to a deviation level of the detected value by the first current sensor, with respect to a current value estimated based on a measured value of electric power to the bi-directional power source and a measured value of electric power supplied from the first smoothing condenser.

13. The power conversion device as set forth in claim 9, wherein the failure decision device, in a case where three or more first current sensors are connected thereto and the switching elements are decided to be in a normal state, specifies that a first current sensor is in an abnormal state, whose value is deviated from values of other first current sensors.

14. The power conversion device as set forth in claim 1, wherein the failure decision device, in a case where three or more first current sensors are connected thereto and the switching elements are decided to be in a normal state, specifies that a first current sensor is in an abnormal state, whose value is deviated from values of other first current sensors.

* * * * *